(12) United States Patent
Fernandez

(10) Patent No.: US 12,393,767 B2
(45) Date of Patent: Aug. 19, 2025

(54) METHODS AND SYSTEMS FOR GENERATING AND SELECTIVELY DISPLAYING PORTIONS OF SCRIPTS FOR NONLINEAR DIALOG BETWEEN AT LEAST ONE COMPUTING DEVICE AND AT LEAST ONE USER

(71) Applicant: Brainwave ThoughtProducts, Inc., Beverly Hills, CA (US)

(72) Inventor: Raul Scott Fernandez, West Hills, CA (US)

(*) Notice: Subject to any disclaimer, the term of this patent is extended or adjusted under 35 U.S.C. 154(b) by 114 days.

(21) Appl. No.: 18/217,855

(22) Filed: Jul. 3, 2023

(65) Prior Publication Data
US 2024/0012980 A1 Jan. 11, 2024

Related U.S. Application Data

(60) Provisional application No. 63/367,764, filed on Jul. 6, 2022.

(51) Int. Cl.
*G06F 40/137* (2020.01)
*G06F 3/04812* (2022.01)
(Continued)

(52) U.S. Cl.
CPC ........ *G06F 40/137* (2020.01); *G06F 3/04812* (2013.01); *G06F 40/197* (2020.01); *G06F 40/226* (2020.01)

(58) Field of Classification Search
CPC .... G06F 40/137; G06F 40/197; G06F 40/226; G06F 3/04812
See application file for complete search history.

(56) References Cited

U.S. PATENT DOCUMENTS 10,223,636 B2 3/2019 Reddy
10,467,003 B1* 11/2019 Mendonca ............... G06F 8/60
(Continued)

FOREIGN PATENT DOCUMENTS

GB 2621474 2/2024

OTHER PUBLICATIONS

International Search Report and Written Opinion issued in App. No. PCT/US2023/026849, mailing date Oct. 23, 2023, 13 pages.
(Continued)

*Primary Examiner* — Tadesse Hailu
(74) *Attorney, Agent, or Firm* — Blueshift IP, LLC; Cynthia M. Gilbert

(57) ABSTRACT

A method for selectively displaying portions of a script for nonlinear dialog between a user participant and a non-user participant includes receiving a first portion of the script including text representing a first branch of the nonlinear dialog and associated with the non-user participant. The method includes receiving a second portion of the script associated with the user participant. The method includes receiving a third portion of the script associated with the non-user participant and including text responsive to text in the second portion. The method includes receiving an instruction to generate a second branch and receiving a fourth portion of the script associated with the user participant in the nonlinear dialog and including text responsive to text in the first portion. The method includes modifying the user interface to remove a display of the second and third portions and to display the text of the fourth portion.

11 Claims, 30 Drawing Sheets

(51) Int. Cl.
  *G06F 40/197*   (2020.01)
  *G06F 40/226*   (2020.01)

(56) References Cited

U.S. PATENT DOCUMENTS

| | | | |
|---|---|---|---|
| 2003/0028498 A1* | 2/2003 | Hayes-Roth | G06N 20/00 706/17 |
| 2011/0093560 A1* | 4/2011 | Morris | H04L 67/02 709/217 |
| 2012/0221502 A1* | 8/2012 | Jerram | G10L 25/27 706/46 |
| 2014/0122619 A1 | 5/2014 | Duan | |
| 2016/0019290 A1* | 1/2016 | Ratnaparkhi | G06F 16/9024 707/743 |
| 2017/0316777 A1* | 11/2017 | Perez | G06F 40/35 |
| 2018/0129484 A1 | 5/2018 | Kannan | |
| 2019/0042988 A1* | 2/2019 | Brown | G06F 16/9535 |
| 2019/0138171 A1 | 5/2019 | Krishnan | |
| 2021/0043194 A1* | 2/2021 | Krishnamurthy | G10L 15/22 |
| 2021/0303799 A1 | 9/2021 | Korhonen | |
| 2022/0043973 A1* | 2/2022 | Arroyo | G06F 40/237 |
| 2022/0253611 A1* | 8/2022 | Galitsky | G06F 16/3329 |
| 2023/0126821 A1* | 4/2023 | Gao | G06F 40/205 704/9 |

OTHER PUBLICATIONS

Combined Search Report and Abbreviated Examination Report issued in App. No. GB2310228.8, dated Dec. 6, 2023, 7 pages.
Examination Report issued in App. No. GB2310228.8, dated Dec. 18, 2024, 1 page.

\* cited by examiner

METHODS AND SYSTEMS FOR GENERATING AND SELECTIVELY DISPLAYING PORTIONS OF SCRIPTS FOR NONLINEAR DIALOG BETWEEN AT LEAST ONE COMPUTING DEVICE AND AT LEAST ONE USER

CROSS-REFERENCE TO RELATED APPLICATIONS

This application claims the benefit of U.S. Provisional Patent Application Ser. No. 63/367,764, filed on Jul. 6, 2022, entitled "Improved method for creating branching dialog," which is hereby incorporated by reference.

BACKGROUND

The disclosure relates to improved methods and systems for creating branching dialog. More particularly, the methods and systems described herein relate to functionality for generating and selectively displaying portions of scripts for nonlinear dialog between at least one computing device and at least one user.

Conventional methods for specifying the actions and dialogs of characters in linear experiences (e.g., stage plays, motion pictures, etc.) are insufficient for specifying the dialog and actions of interactive characters in non-linear, interactive experiences such as those provided in video games, interactive fiction, or intelligent assistants. Since the actions of the player (or reader, or user) alter which content is presented, a single linear script cannot clearly portray the sequence of every player's unique experience. And for all but the simplest of non-linear experiences, it is impractical to create a document that contains every possible variation of the experience due to the large number of content permutations that the experience allows. One conventional method for addressing this problem is to create brief linear script segments, indicate the conditions under which the segment should be utilized, and indicate which segment should immediately follow the segment. These brief segments are then collated into a single script and can be read in much the same fashion as a "choose-your-own-adventure" book, by flipping back and forth through the script per the conditions and references accompanying each segment. Such an approach, however, remains limited given the large number of content permutations that non-linear experiences typically allow.

Another approach was to notate the content on physical cards and arrange them as "nodes" in a branching tree graph or decision tree diagram. This method allows the author to understand the flow of the overall experience at a glance. But for any robust interactive experience, it takes a large amount of area and is difficult to transport. The experience could be memorialized into a paper version of the diagram, but the spatial challenge remained; any robust experience possessed too many nodes to be displayed on a single sheet of standard paper while retaining legibility. Decision trees had to be segmented into smaller chunks, which made understanding the experience difficult. Alternatively, the chart could be printed on very large sheets of paper, which made the information difficult to reproduce and distribute. Finally, from an authoring perspective, writing small chunks of content onto individual cards interrupts the seamless creative flow that is achievable when writing a linear script.

With the advent of advanced computer graphics capabilities and software, many custom tools have been created to try to address this problem of authoring non-linear experiences. The most common approach is to use a visual representation of a branching tree graph (as depicted in FIG. 1), known in the industry as a dialog tree. Content is authored directly into individual nodes of the diagram, which are then connected to other nodes to form a decision tree that shows the branches of the conversation. However, while a digital visual representation of the decision tree has many advantages over the physical version of the same approach, crucial drawbacks remain. For any robust experience, limited screen real estate prevents displaying the overall structure with the content at a legible scale. If an author zooms out enough to see the whole experience, the content is too small to read. If the author zooms in enough to read the content, only a few nodes are visible. For the author to read through the script, they must scroll over vast areas of the diagram to find the sequence of nodes for the path that they are trying to assess. Other conventional approaches, such as those that provide scripting or markup languages, typically result in a text that is difficult to read, as individual lines of dialog are interspersed with markup or scripting commands; dialog for alternate paths is interspersed throughout the text, making reading and reviewing the content a difficult process involving skipping through the document to find the next appropriate line of dialog.

Therefore, there is a need for a technical solution for receiving user input for sequencing dialog and actions without the disadvantages that result from the limitations of conventional approaches.

BRIEF SUMMARY

In one aspect, a method for generating and selectively displaying portions of scripts for nonlinear dialog between at least one computing device and a user includes receiving, by a user interface for receiving from an author a plurality of portions of a script for a nonlinear dialog between a user participant in the nonlinear dialog and a non-user participant in the nonlinear dialog, a first portion in the plurality of portions of the script, the first portion including text representing a first branch of the nonlinear dialog and associated with the non-user participant. The method includes receiving, by the user interface, a second portion of the script, the second portion associated with the user participant in the nonlinear dialog and including text responsive to the text in the first portion. The method includes receiving, by the user interface, a third portion of the script associated with the non-user participant, the third portion including text responsive to text in the second portion. The method includes receiving, by the user interface, an instruction to generate a second branch of the nonlinear dialog. The method includes modifying the user interface to remove a display of the second portion of the text and of the third portion. The method includes receiving, by the user interface, a fourth portion of the script, the fourth portion associated with the user participant in the nonlinear dialog and including text responsive to text in the first portion. The method includes receiving, by the user interface, a fifth portion of the script associated with the non-user participant, the fifth portion including text responsive to text in the fourth portion. The method includes generating a version of the script for display including the first portion and the fourth portion and the fifth portion.

In another aspect, a method for displaying and modifying a branching dialog tree which contains at least one node representing dialog of at least one computer-controlled character and at least one node representing the input of at least one user includes displaying a dialog content of a first node in a dialog tree as a first line of text in a plurality of lines of text. The method includes displaying, below the first line of text, a dialog content of a first descendant node of the first node as a second line of text in the plurality of lines of text. The method includes repeating the displaying of the dialog content of the descendent node for each descendant node of the first descendant node of the first node until reaching a node with no descendants. The method includes receiving user input including placement of a text-insertion cursor within a displayed line of text in the plurality of lines of text and including modified text. The method includes modifying, in response to the received user input, the dialog tree to include, in a node associated with the line of text at which the user input was received, the dialog content of the node associated with the line of text includes the modified text.

In still another aspect, a method for displaying and modifying a branching dialog tree which contains at least one node representing dialog of at least one computer-controlled character and at least one node representing the input of at least one user includes displaying a dialog content of a first node in a dialog tree as a first line of text in a plurality of lines of text. The method includes displaying, below the first line of text, a dialog content of a first descendant node in a plurality of descendant nodes of the first node as a second line of text in the plurality of lines of text. The method includes displaying the dialog content for each descendant node of the first descendant node of the first node until reaching a node with no descendants. The method includes receiving user input including (i) an identification of displayed dialog content and (ii) an identification of a second node in the dialog tree. The method includes, in response to the received user input, (i) identifying a node in the dialog tree associated with the identified displayed dialog content, (ii) removing the visual representation of the identified dialog content and of dialog content of any descendant nodes of the identified node in the dialog tree associated with the identified displayed content, and (iii) displaying a dialog content of the identified second node.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

The methods and systems described herein may provide functionality for generating and selectively displaying portions of scripts for nonlinear dialog between at least one computing device and at least one user. The methods and systems described herein may execute functionality allowing an author to write one or more sequences of dialog and actions (e.g., dialog branches), wherein a computer-controlled character or intelligent assistant interacts with a user, in such a manner as to obscure the underlying decision-tree-based data structure and instead present it to the author in a format mimicking a linear-formatted script. The methods and systems described herein provide both point-and-click and keyboard-based methods that allow the author to create dialog branches based on user responses, as well as to join branches back to the main activity flow, all while maintaining the appearance and ease-of-creation of a linear-formatted script. Further, the author can sequentially review multiple paths through the dialog tree by selecting the desired dialog branches and the functionality executed by the methods described herein will automatically generate a linear-formatted script of the resulting conversation. The methods and systems described herein may execute functionality with which to receive from an author attribute information to both input and output dialog nodes, segmenting content for asset production, and a means for viewing this information in context.

Figure 1:
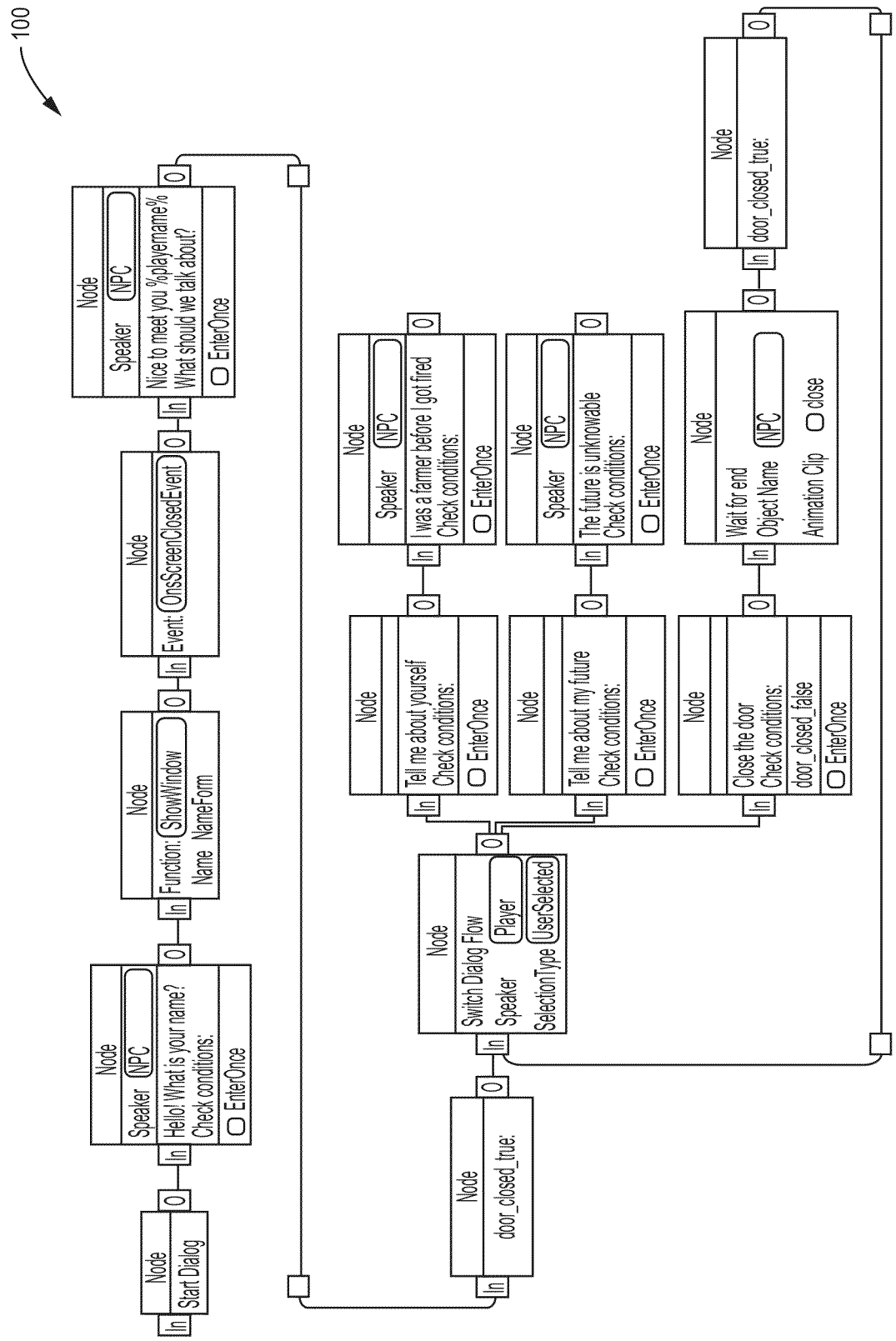
FIG. 1 is a diagram depicting a prior art embodiment of a conventional node-based dialog design system.
Figure 2A:
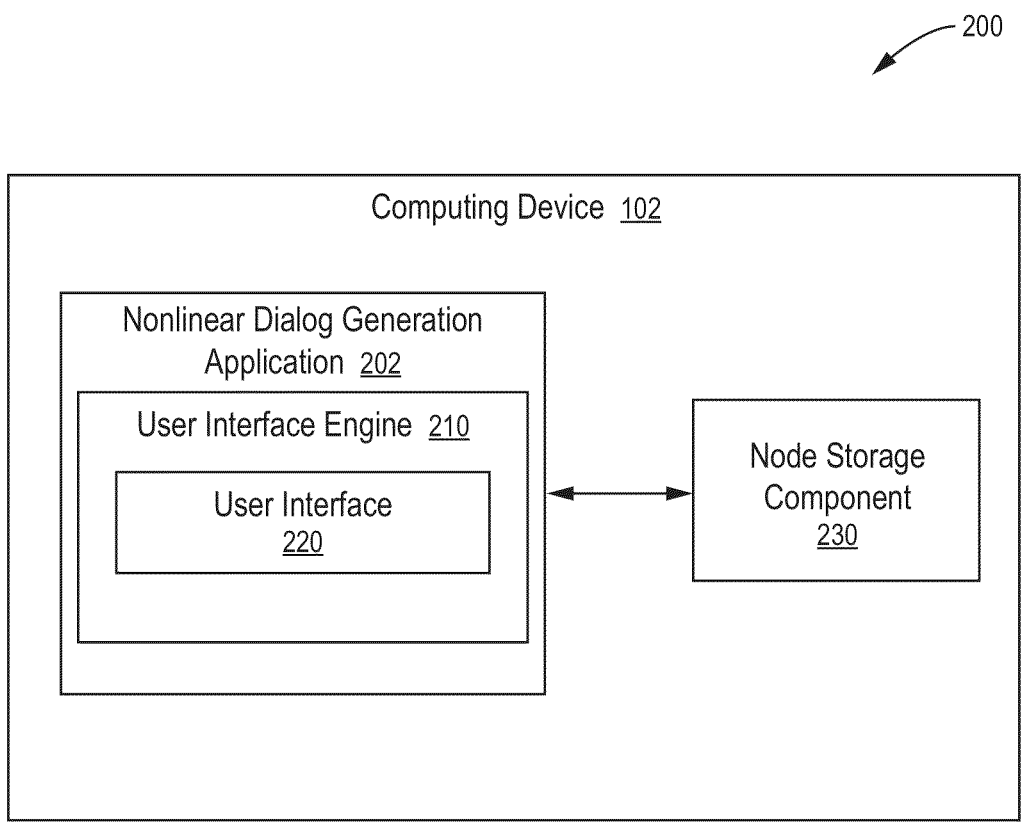
FIG. 2A is a block diagram depicting an embodiment of a system for generating and selectively displaying portions of scripts for nonlinear dialog between at least one computing device and at least one user.

Referring now to FIG. 2A, a block diagram depicts one embodiment of a system 200 for generating and selectively displaying portions of scripts for nonlinear dialog between at least one computing device and a user. The system 200 may generate and display a user interface 220 for receiving from an author a plurality of portions of a script for a nonlinear dialog between a user participant in the nonlinear dialog and a non-user participant in the nonlinear dialog. The nonlinear dialog may be a dialog in any environment providing human-computer interaction, including, without limitation, interaction via video games, interactive fiction, or intelligent assistants. In brief overview, the system 200 includes a computing device 102 executing a nonlinear dialog generation application 202, a user interface engine 210, a user interface 220, and a node storage component 230.

Figure 18A:
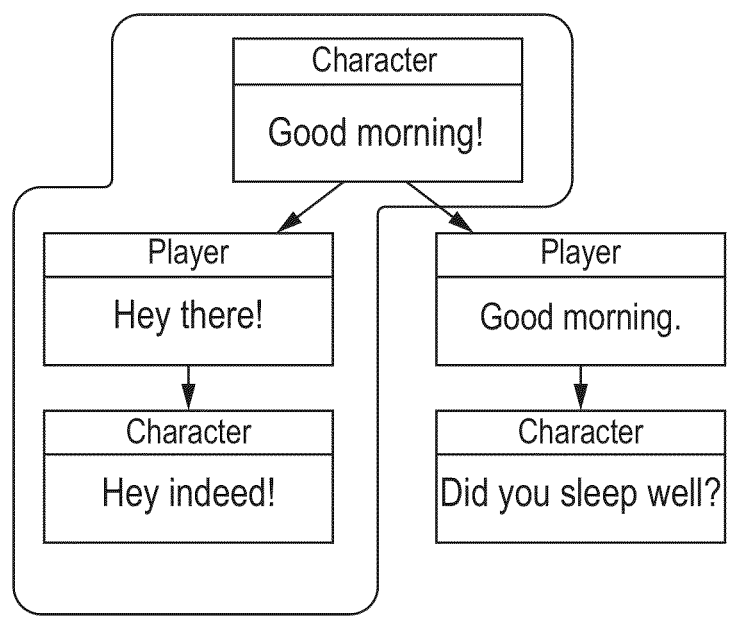
FIG. 18A is diagram depicting one embodiment of a first branch in a nonlinear dialog.
Figure 18B:
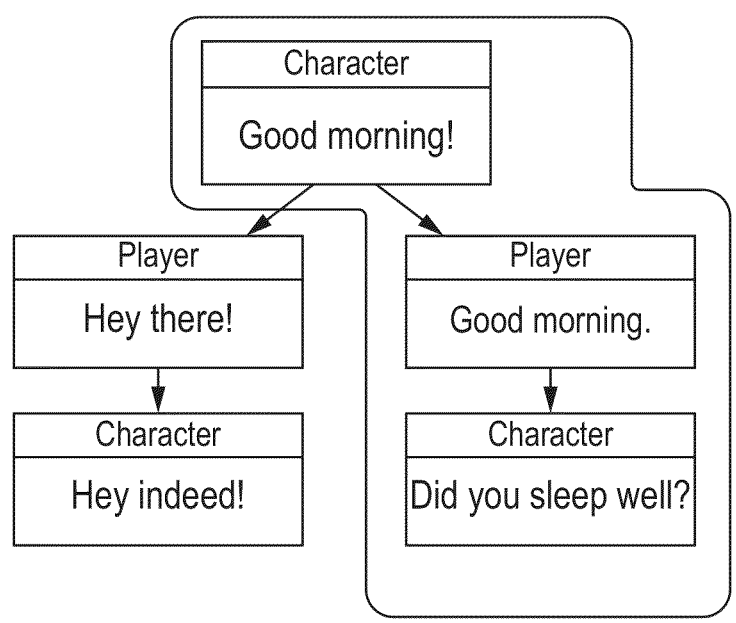
FIG. 18B is a diagram depicting one embodiment of a second branch in a nonlinear dialog.

Referring ahead to FIGS. 18A-18B, two diagrams provide exemplary illustrations of branches in a nonlinear dialog. FIG. 18A provides a visual example of the first branch with two portions of dialog—the branch in which in response to the character line of dialog "Good morning!", the player says, "Hey there!" and the character is to respond, "Hey Indeed!". As depicted in FIG. 18B, the second branch of the nonlinear dialog includes two different portions of dialog responding to the character output line "Good morning"—the player input line of "Good morning." and the character output line of "Did you sleep well?"

Referring back to FIG. 2A, the nonlinear dialog generation application 202 may be provided as a software component. The nonlinear dialog generation application 202 may be provided as a hardware component. The computing device 102 may execute the nonlinear dialog generation application 202. The nonlinear dialog generation application 202 may execute the user interface engine 210 to display a user interface 220 to a user of the nonlinear dialog generation application 202; the user may be referred to herein as an author. The nonlinear dialog generation application 202 may receive data from a user via the user interface 220. The nonlinear dialog generation application 202 may store some or all of the received data in the node storage component 230. The node storage component 230 may be a database. The node storage component 230 may be any data structure in which the nonlinear dialog generation application 202 may store data. The node storage component 230 may be an internal storage system of any type. The node storage component 230 may be a document storing node data in a tree structure.

Figure 2B:
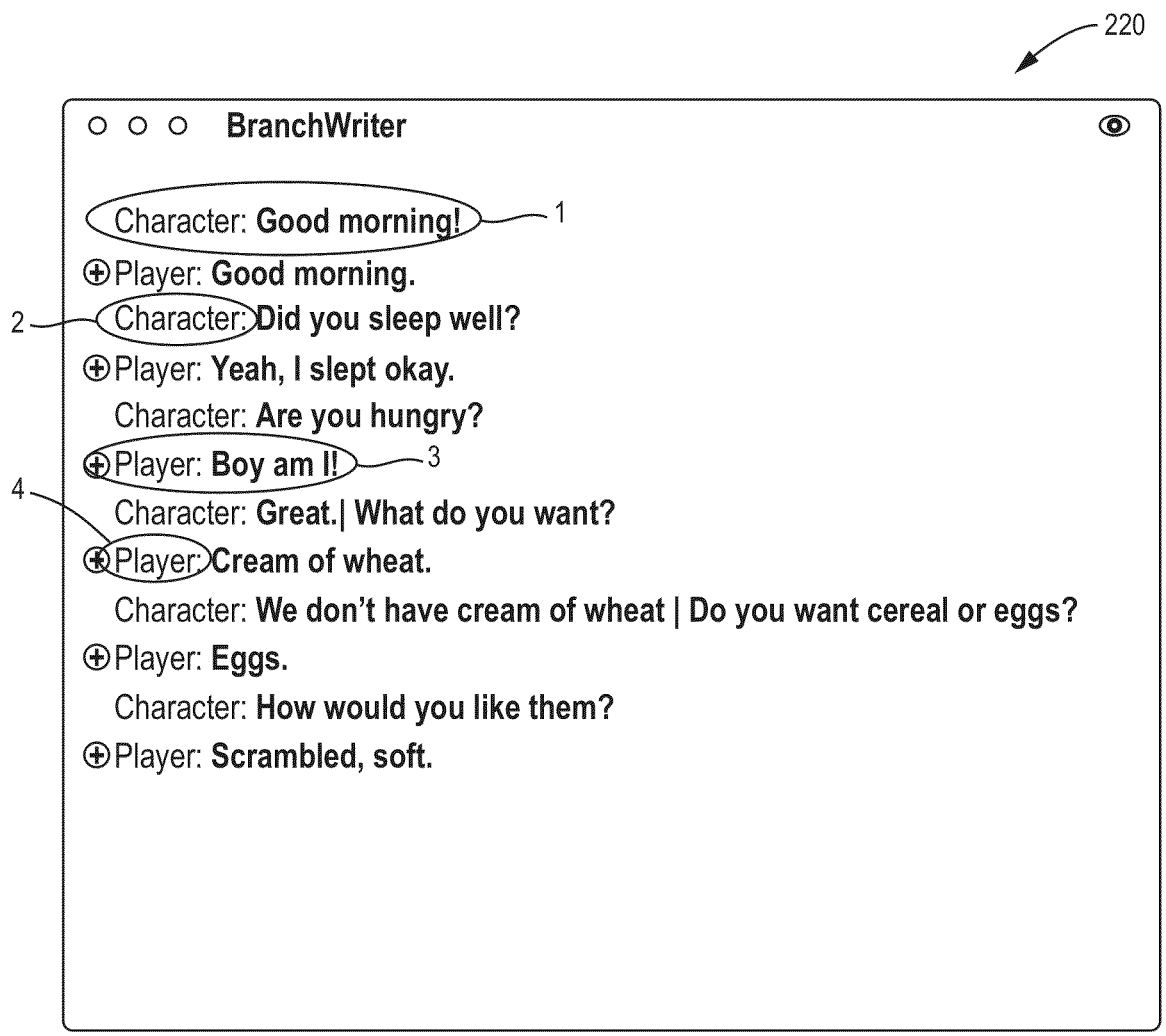
FIG. 2B is a block diagram depicting a user interface in an embodiment of a system for generating and selectively displaying portions of scripts for nonlinear dialog between at least one computing device and at least one user.

Referring now to FIG. 2B, a block diagram depicts one embodiment of the user interface 220 in the system 200. The user interface engine 210 may generate the user interface 220 for display to the author that simulates the appearance of a blank word-processing document. In one embodiment, the user interface 220 displays one or more interactions between a computer-controlled character (hereinafter, the character or non-user participant) and a non-author user that is a person interacting with the character (hereinafter, the Player) as a set of alternating lines of dialog. The character's lines (e.g., lines 1 and 3 of FIG. 2B) are prefaced with the name of the character provided by the author, or if unspecified, simply "character:" (as shown in FIG. 2B at 2). As shown in FIG. 2B at 4, the player's lines (e.g., line 3 of FIG. 2B) are prefaced with the text "player:".

In one embodiment, text appears at the top of the document's text area, including the name of the computer-controlled character followed by a colon, or the text "Character:", if no name has been previously specified. The user interface engine 210 creates a dialog node in the node storage component 230 in a node associated with this line. In one embodiment, the text-insertion cursor is placed to the right of the colon. As the author begins typing, the user interface engine 210 receives the text from the user interface 220 and saves the text into a dialog node in the node storage component 230 along with metadata that specifies additional details about the node. When the author presses the return key on the keyboard, the user interface 220 may automatically display text on the following line containing the text "Player:" and place the text-insertion cursor to its right. The author then types in the dialog for the player. The user interface engine 210 may create another dialog node containing this dialog as a child node (also referred to as a descendant node) of the previous node and define it as a user-input node to be accessed when a player/user participant says the dialog specified in the text field. When the author again presses the return key on the keyboard, the user interface 220 automatically displays text on the following line containing the name of the character (or "Character:") and again places the text-insertion cursor to its right. The author can then type the computer character's response to the user. The user interface engine 210 may then create another dialog node, linking it as the destination of the previous user-input node and defining it as an output node to be executed when the user says the dialog specified in the text field of the previous user-input node. Repeating the above sequence, the author can quickly create a linear pass through the dialog tree without needing to explicitly specify any information about node types or topology.

When the author indicates that the system 200 is to create a branch in the dialog, user interface engine 210 enables this via at least two methods. In one embodiment, when the author presses an onscreen button associated with the desired user-input node, (e.g., a "plus" button to the left of a particular line of "Player:" text), the user interface engine 210 hides the content of the corresponding user-input node in the user interface 220, creates a new user-input node, and associates it with that prompt in the script. The user interface engine 210 also hides the text of any output nodes and input nodes that appeared below the selected input node in the document's text area. The text-insertion cursor is then placed to the right of the "Player:" text to allow the author to enter text for the new input node. In another embodiment, the author specifies where the user interface engine 210 is to create a new branch by navigating the text-insertion cursor to the desired player dialog line and then either pressing a command key on the keyboard or selecting a menu command. In still another embodiment, the author may provide a spoken command to specify where the user interface engine 210 is to create a new branch. Providing input in any of these manners produces the same result as clicking the button described above. As will be understood by those of skill in the art, the author may provide instructions according to one embodiment for one instruction and may then provide instructions according to any of the other embodiments for another.

When the author instructs the user interface engine 210 to display a different a branch in the dialog, the user interface engine 210 enables this in at least two ways. In one embodiment, when the author "clicks" on a button embedded within the text of any input node, e.g., within the "Player:" text, or on a distinct button associated with each user-input node, the user interface engine 210 presents a popup menu displaying all existing player-dialog options that are the children of the preceding output node. The author can then select the branch they desire to make visible, and the user interface engine 210 will display the associated input dialog to the right of the "Player:" text. The user interface engine 210 also replaces the text that appeared below the selected input node with the text of the most recently displayed destination output node and its further descendants. In another embodiment, the author can view a branch by first navigating the text-insertion cursor to the desired "Player" line and pressing a command key on the keyboard or selecting a menu command. Doing so has the same result as clicking the button described above. In still another embodiment, the author may provide a spoken command to display a different branch of the dialog. As will be understood by those of ordinary skill in the art, the author providing the instruction need not explicitly type out the instruction but may, as described above, use an interface element such as an icon of a plus sign or enter via keyboard a predefined command key or combination of keys or provide a spoken voice command to trigger the creation of a new branch in the nonlinear dialog.

Figure 3A:
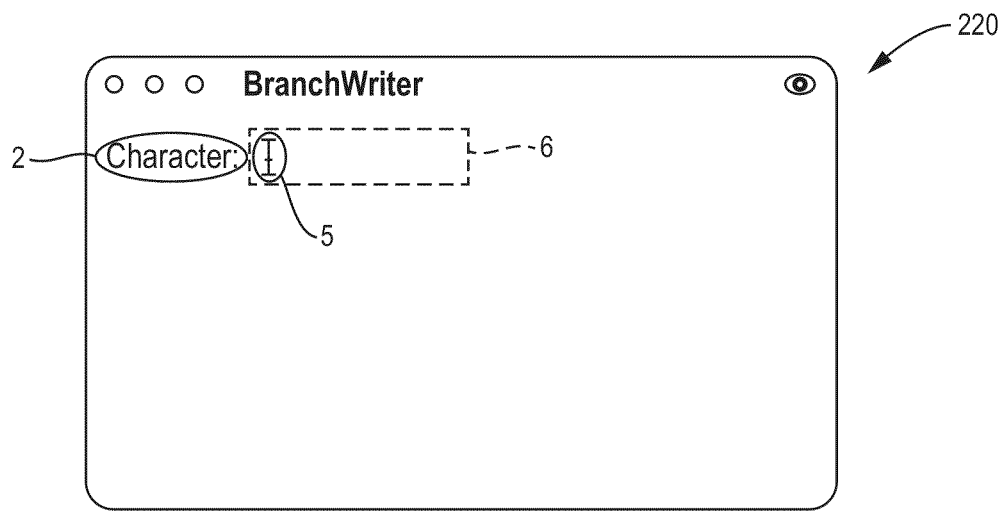
FIGS. 3A-3B are block diagrams depicting an embodiment of a user interface for adding dialog to a nonlinear dialog script in a system for generating and selectively displaying portions of scripts for nonlinear dialog between at least one computing device and at least one user.
Figure 3B:
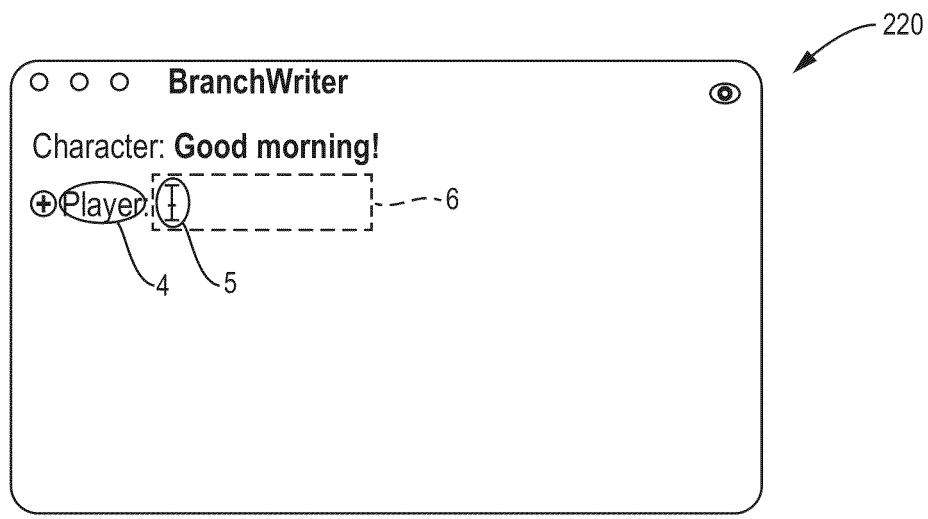

Referring now to FIGS. 3A-3B, upon opening a new document, the author is presented with a user interface (e.g., a window) with a text prompt labeled "Character:" (as shown in FIG. 3A at 2). In an embodiment in which the author has provided a name for the character, the user interface 220 may display the name of the character instead of the word "character." The text-insertion cursor 5 is placed at the leading edge of a text-entry field with preferably invisible boundaries 6 that is placed just to the right of the colon. The author may then type the character's dialog (and actions if any) into the text field. When the author does so, the system 200 creates a corresponding node in its internal storage system (e.g., the node storage component 230) containing the entered text, along with any additional metadata that indicates, for example, that the dialog or actions should be associated with the character. This node may be designated as an "output node." When the author presses the designated end-of-line key (typically the "return" key) on the keyboard as shown in FIG. 3B, the system 200 presents a new text prompt titled "Player:" 4, followed by another text-entry field with optionally invisible boundaries 6 and moves the text-insertion cursor 5 to the leading edge of this field. When the author types into this text field, the system 200 creates a corresponding node, in the node storage component 230, containing the entered text, and designates it as an "input node." The node is then assigned as a "child node" (or "descendant node") of the preceding output node.

In some embodiments, the above process occurs with all text entry taking place in a single text field; the appropriate "Character:" or "Player:" prompt is added automatically by the user interface engine 210 into the next line of the text field upon receiving the designated end-of-line character, and the cursor is automatically placed to the right of the prompt to allow the author to enter dialog and actions.

Figure 4A:
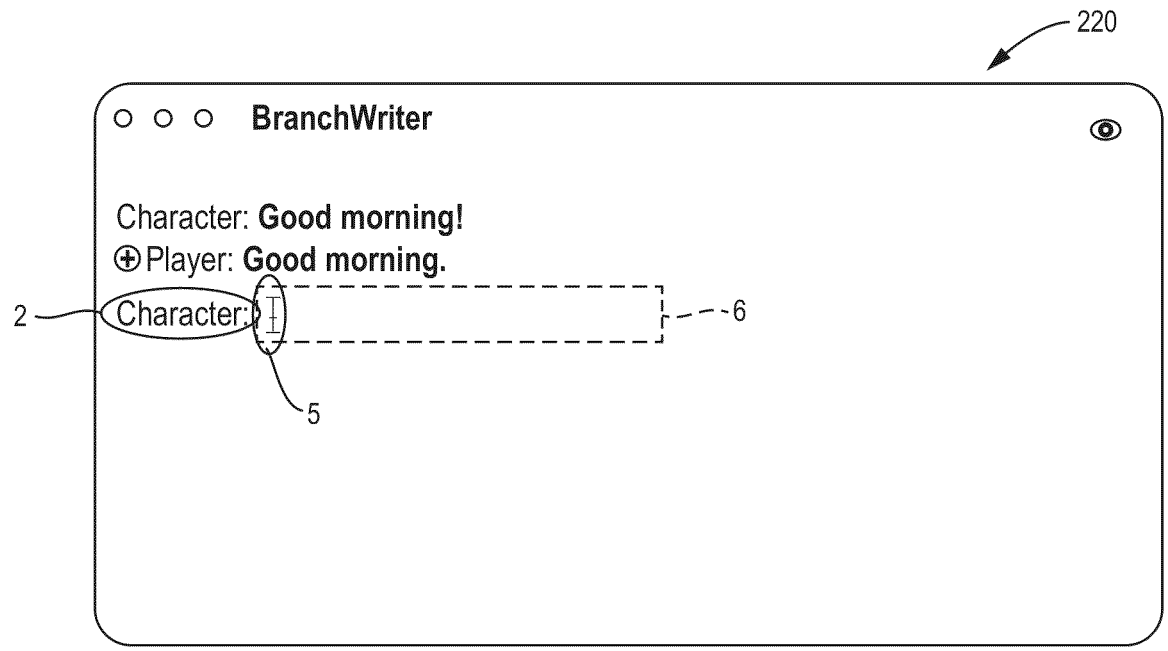
FIGS. 4A-4B are block diagrams depicting an embodiment of a user interface for adding dialog to a nonlinear dialog script in a system for generating and selectively displaying portions of scripts for nonlinear dialog between at least one computing device and at least one user.
Figure 4B:
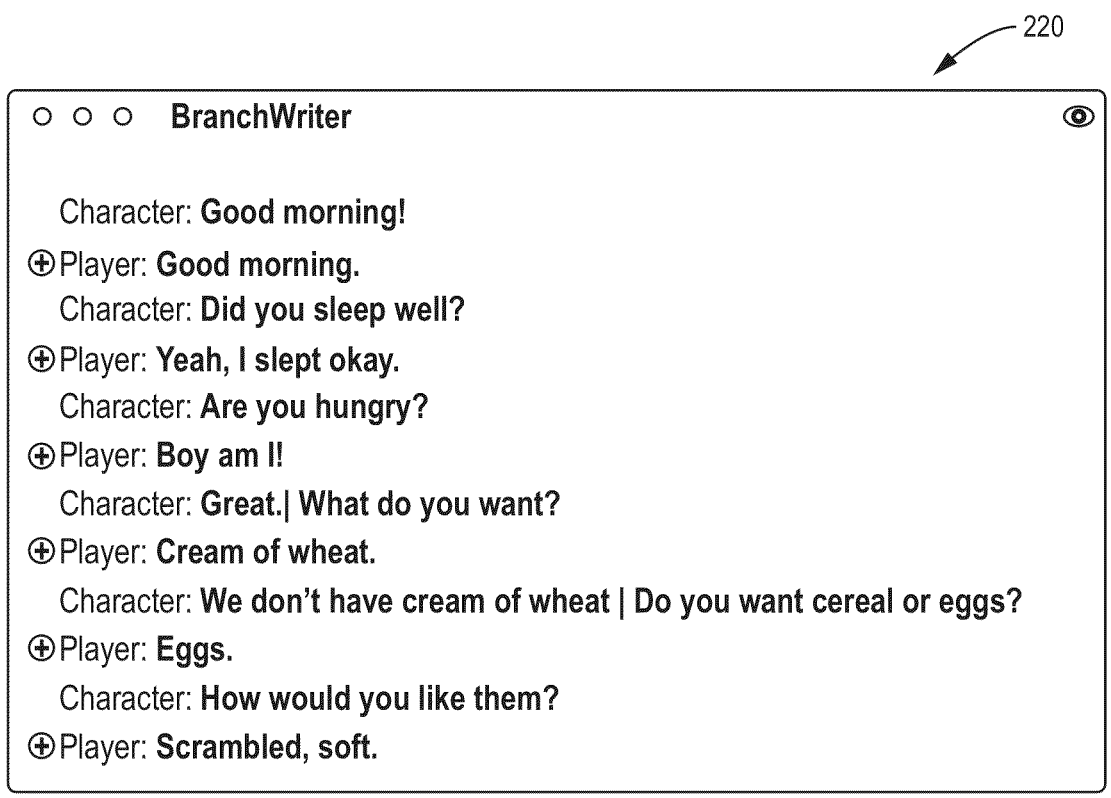

Referring now to FIG. 4A-4B, block diagrams depict an embodiment of a user interface for adding dialog to a nonlinear dialog script in a system for generating and selectively displaying portions of scripts for nonlinear dialog between at least one computing device and at least one user. As shown in FIG. 4A, when the author presses a designated end-of-line key, the system 200 presents a new text prompt titled "Character:" (FIG. 4A at 2) followed by another text-entry field 6 with optionally invisible boundaries and moves the text-insertion cursor 5 to the leading edge of this field. When the author types into this text field, the system creates a corresponding output node in the node storage component 230 containing the entered text. The node is then assigned as a "destination node" of the preceding input node. Thus, by alternately typing the dialog for the character and the player separated by the designated end-of-line key, the author is able to create a branch in a dialog tree that represents the flow of the conversation, as shown in FIG. 4B.

Figure 5A:
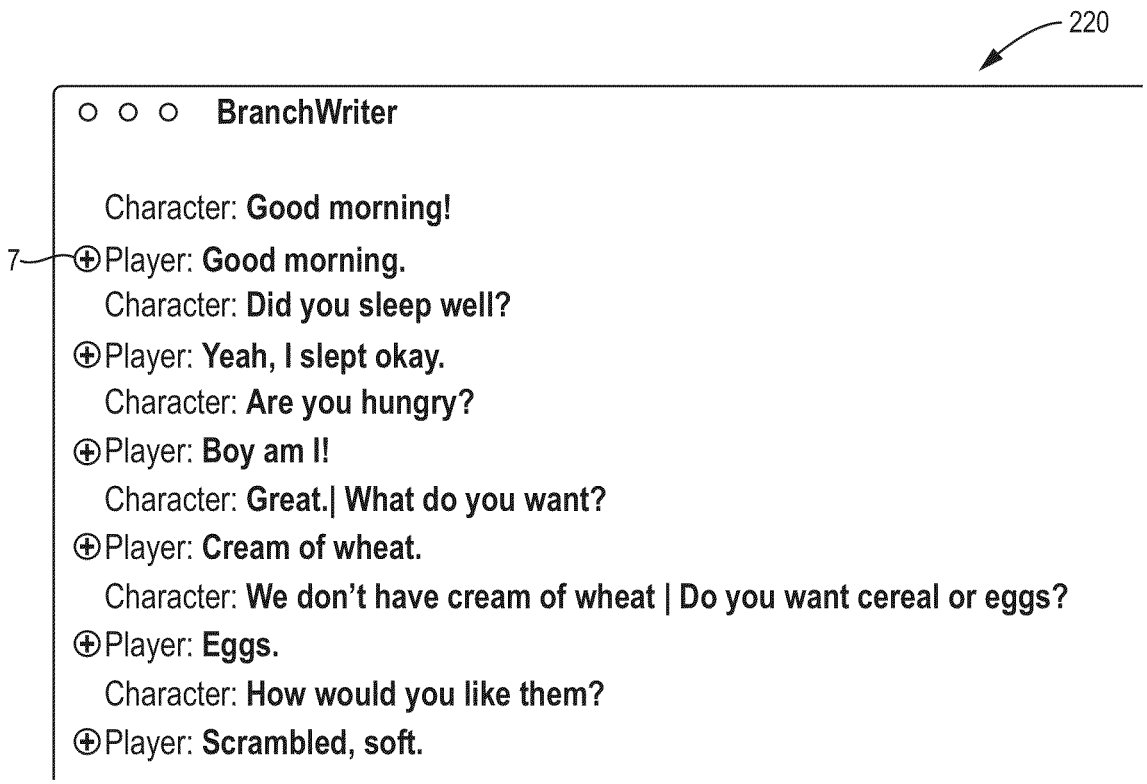
FIGS. 5a-5c are block diagrams depicting an embodiment of a user interface for creating a new dialog branch via a button press in a system for generating and selectively displaying portions of scripts for nonlinear dialog between at least one computing device and at least one user.
Figure 5B:
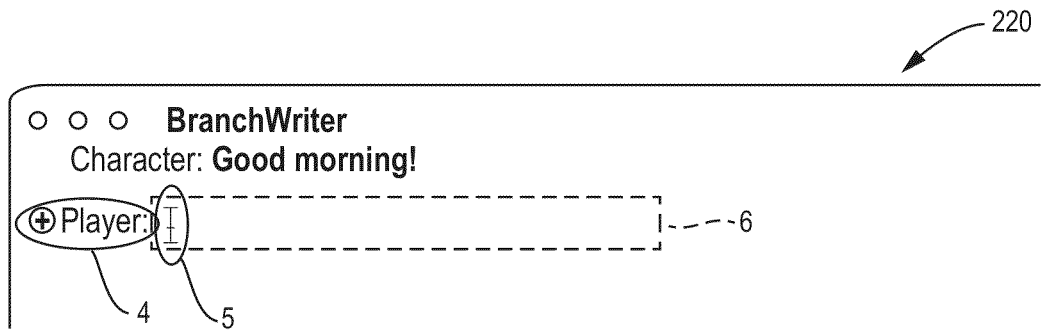
Figure 5C:
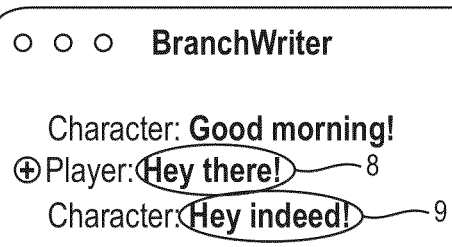
Figure 6:
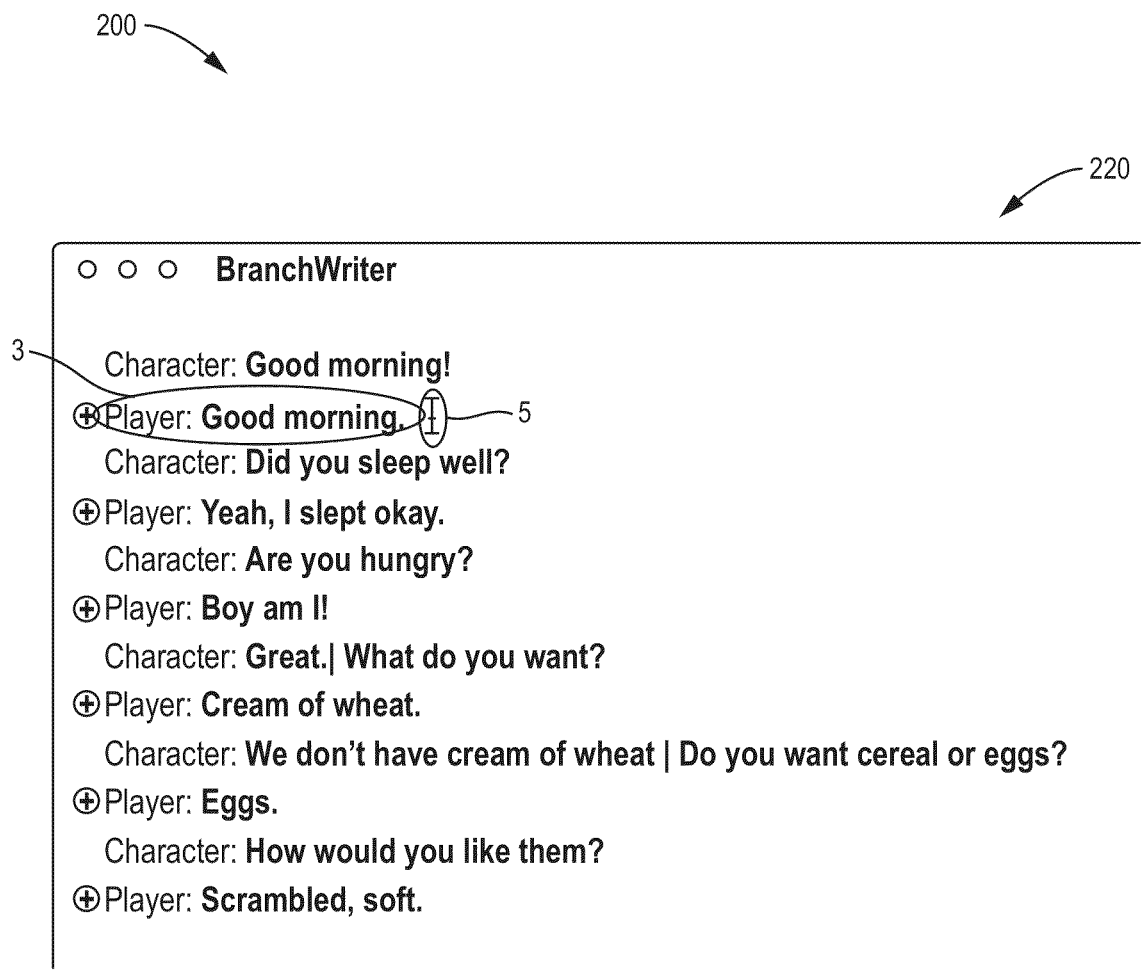
FIG. 6 is a block diagram depicting an embodiment of a user interface for creating a new dialog branch via text-insertion cursor in a system for generating and selectively displaying portions of scripts for nonlinear dialog between at least one computing device and at least one user.
Figure 7:
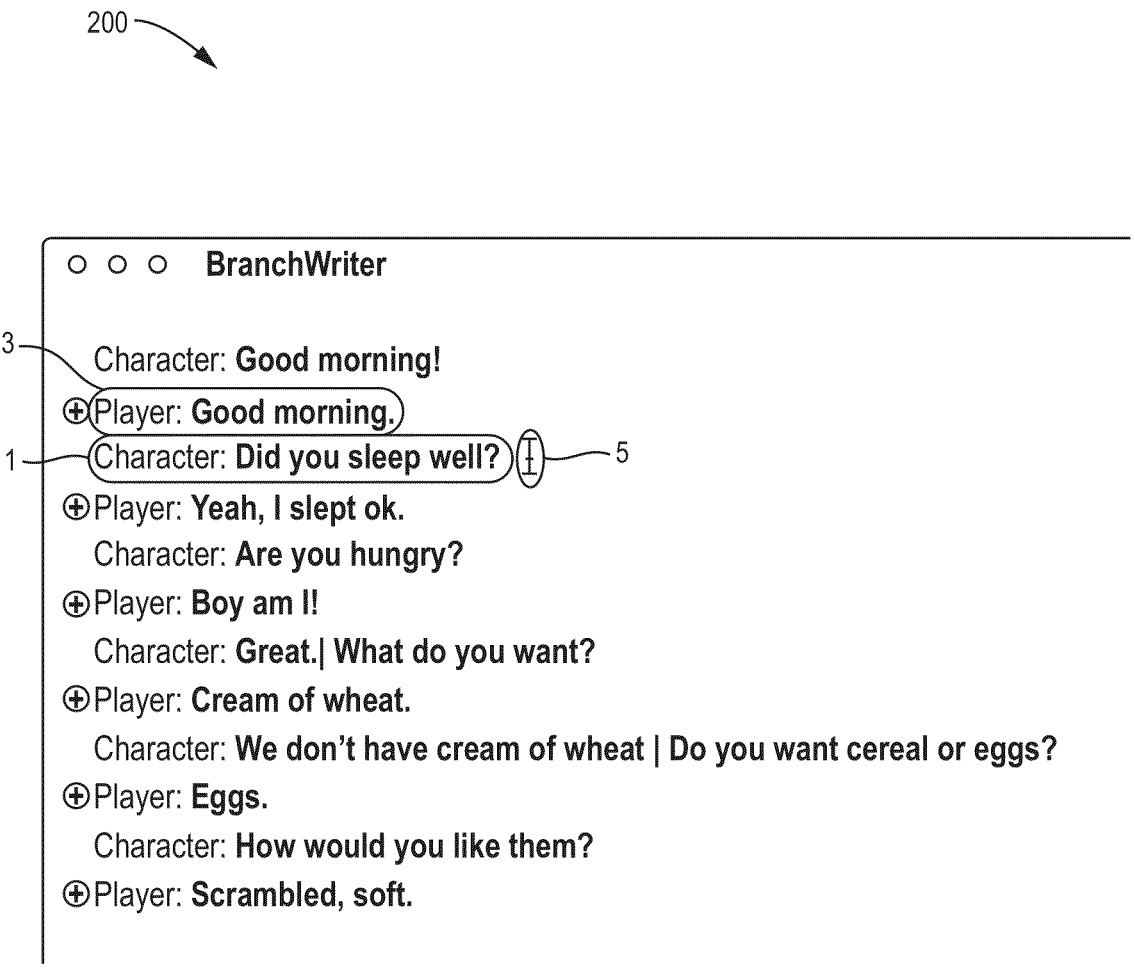
FIG. 7 is a block diagram depicting an embodiment of a user interface for creating a new dialog branch via text-insertion cursor in a system for generating and selectively displaying portions of scripts for nonlinear dialog between at least one computing device and at least one user.

Referring now to FIGS. 5A-5B, block diagrams depict an embodiment of a user interface 220 for creating, by an authoring user (also referred to as the "author") a new dialog branch via a button press in a system for generating and selectively displaying portions of scripts for nonlinear dialog between at least one computing device and at least one user (who may also be referred to as a player). The system 200 provides functionality for creating a branch in the conversation based on receipt of different input from the player. In the embodiment depicted by FIG. 5A, the author may press (e.g., via a pointing device) an onscreen button (7) situated just to the left of the "Player:" prompt. Referring ahead to FIG. 6, instead of selecting the user interface element shown in FIG. 5A at 7, the author may navigate the text-insertion cursor 5 to the Player's dialog line 3 and then press a command key on a keyboard associated with branch creation, e.g., Command-Plus sign, to provide an instruction to create an alternative response. As depicted in the block diagram of FIG. 7, these methods for providing instructions are available to the authoring user regardless of whether the instruction to create the branch is given when the text-insertion cursor is in a line of text containing dialog for a character, or one containing dialog for a player. Since the position of the text-insertion cursor 5 in FIG. 7 is the natural position after the creation of the Character's response to the Player's input, the author can quickly create multiple responses to a single prompt by typing the Player's response, the end-of-line key, the Character's response back to the Player, and the branch-creation key. Regardless of which method the authoring user executes to provide the instruction to create the branch in the conversation, doing so will create another input node, assign it as a child of the preceding output node, and then display an empty text field and insertion cursor to the right of the "Player:" prompt, as depicted in FIG. 5B. As shown in FIG. 5C, the author can then enter the new Player dialog 8 and the Character's new response dialog 9.

Upon creation of the new branch in the dialog, the user interface 220 also hides from view the display of the text associated with the input node that was previously referenced at that point in the flow, its associated destination node, and any other subsequent nodes. As shown in FIG. 5B-5C, all of the lines of text after the output line "Good morning!" are replaced with the lines of text associated with the new branch in the tree. Therefore, although FIG. 5A depicts the player and character having an extensive conversation regarding whether the player slept well, whether the player is hungry, what the player wants to eat, what the player wants to eat if the initial request is unavailable, and how the player wants the chosen food prepared, in FIG. 5C, all of that text is removed from display and what is displayed instead are the lines of dialog associated with the second branch—an initial exchange of "Hey there!" and "Hey indeed!". In this way, the author has a view of the lines of dialog the author is currently adding to the script without having lost any of the text from the first branch of dialog; the dialog tree has preserved the exchange regarding sleep and food choices and the author may view those lines again at any time without having the display of those lines from the first branch interfere or distract from the ability to view and add to lines of text in the second branch.

Figure 8:
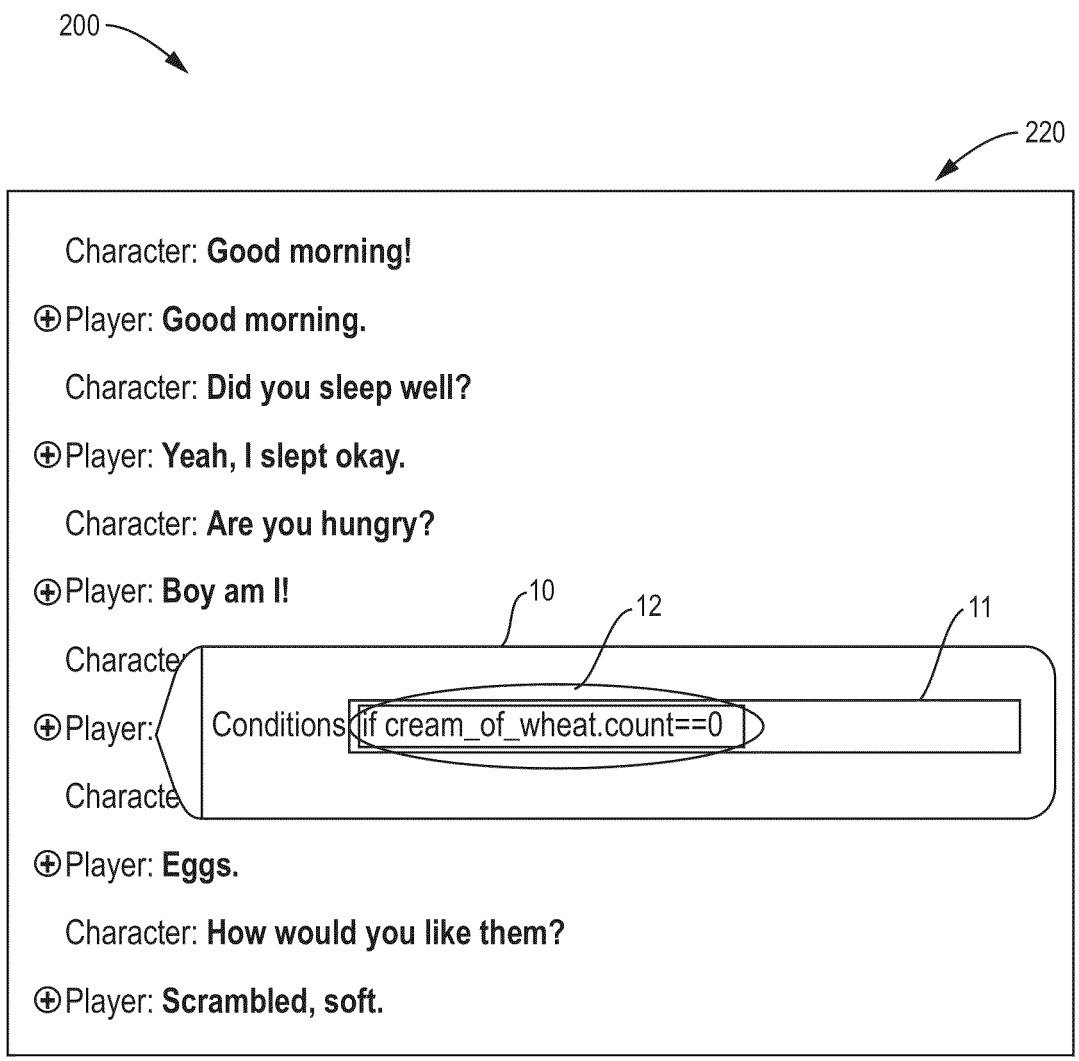
FIG. 8 is a block diagram depicting an embodiment of a user interface with which to receive an instruction to follow a branch in a dialog tree contingent upon an author-specified condition in a system for generating and selectively displaying portions of scripts for nonlinear dialog between at least one computing device and at least one user.

Referring now to FIG. 8, a block diagram depicts an embodiment of a user interface in which the system receives an instruction to follow a branch in a dialog tree contingent upon an author-specified condition or other factors than the Player's line of dialog. To record this, the system 200 provides functionality for assigning a set of conditions to each input node. As depicted in FIGS. 6-7 above, the author may move the text-insertion cursor 5 to the line at which the author intends to provide the instruction. As depicted in FIG. 8, the author may type a pre-defined special character (e.g., without limitation, the equals sign), which causes the user interface 220 to depict a popup 10 containing a text field 11 that displays the input node's current conditions 12. The author can then enter or edit the node's conditions and press "return" on keyboard 207 when done. These conditions will then appear in any menus to aid in identification of the input node.

Figure 9A:
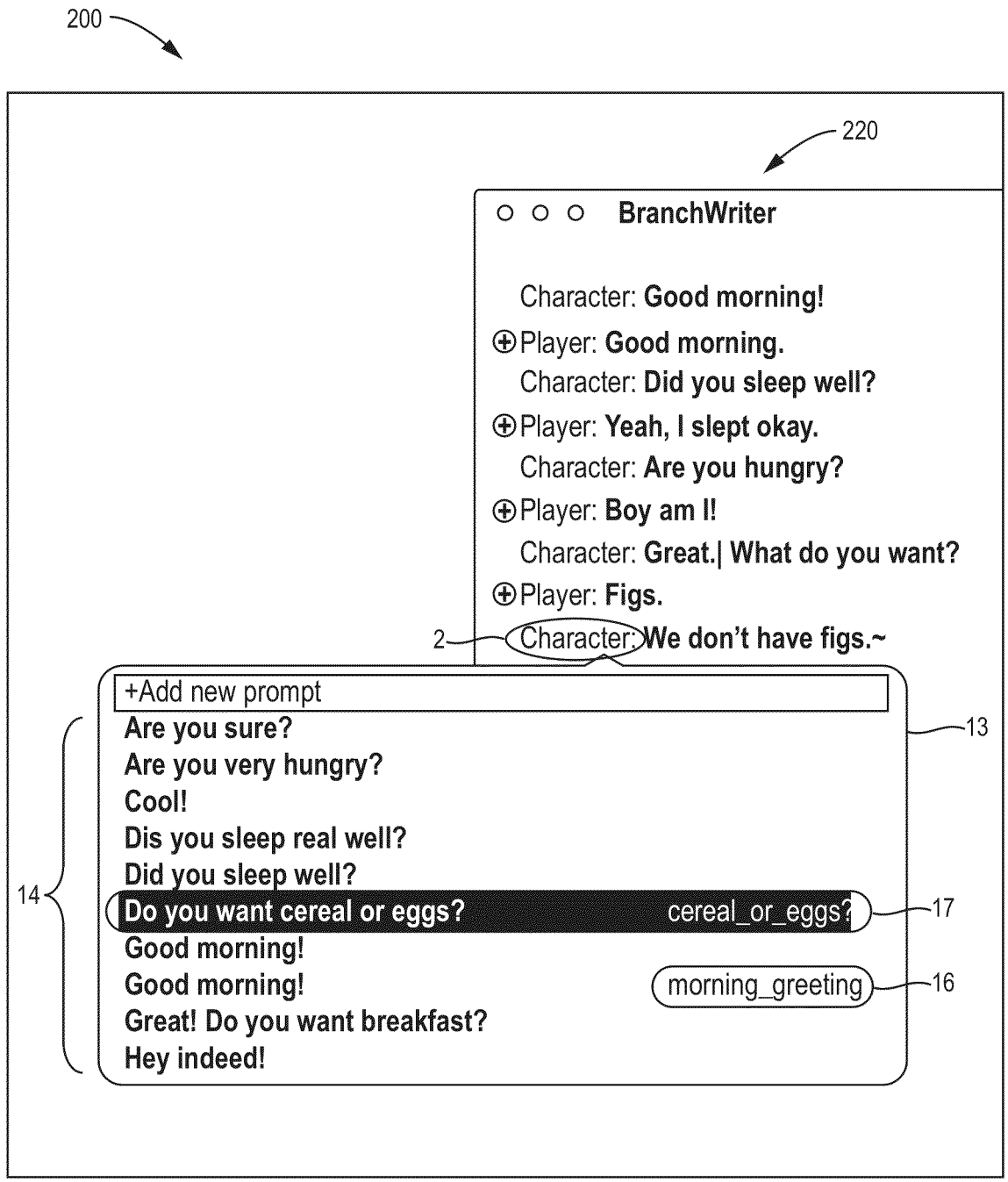
FIGS. 9A-9B are block diagrams depicting one embodiment of a user interface with which a user may provide instructions to merge a branch back to a destination node in a system for generating and selectively displaying portions of scripts for nonlinear dialog between at least one computing device and at least one user.
Figure 9B:
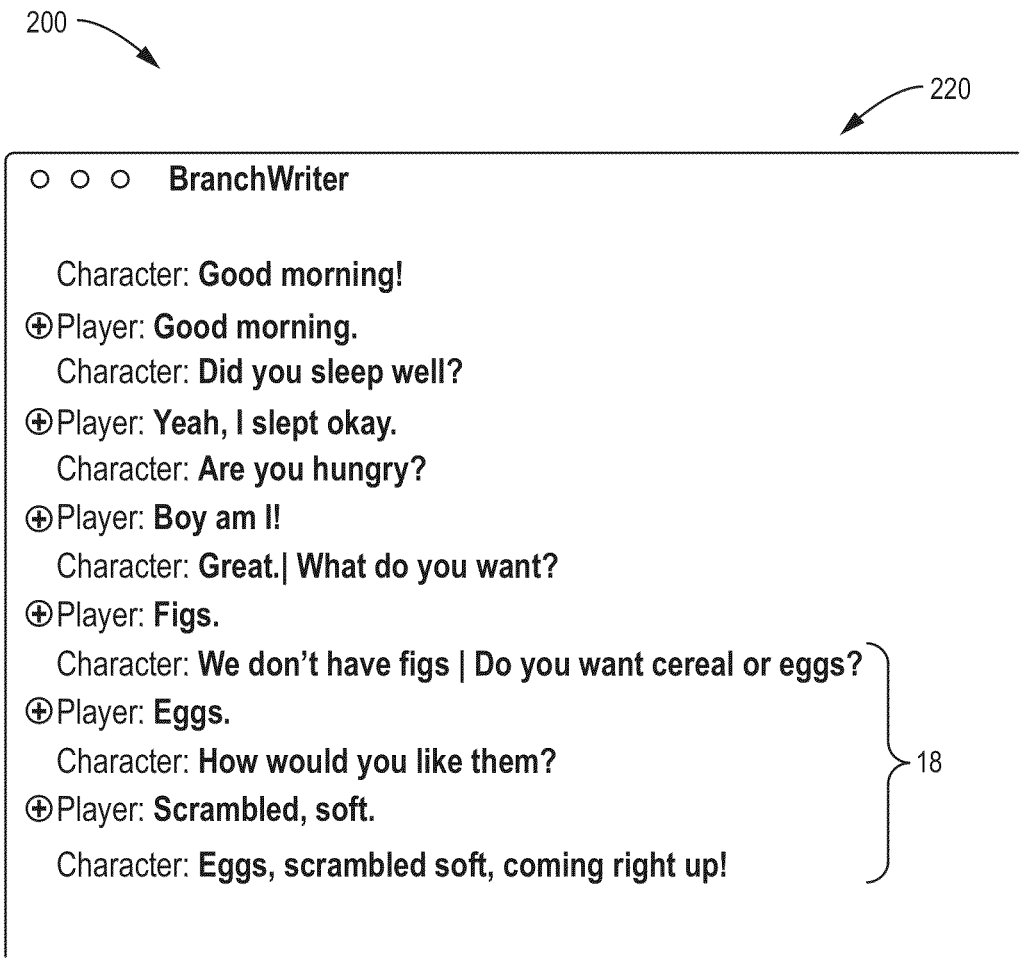

Referring now to FIG. 9A-9B, block diagrams depict one embodiment of a user interface with which a user may provide instructions to merge a branch back to a destination node. In most interactive conversations, there are points in the dialog tree where multiple branches should lead back to a single destination node. The system 200 executes functionality to enable this merger. As indicated above, authors may provide instructions either by clicking on an area of the user interface (e.g., without limitation, the word "Character") or by inserting the text-insertion cursor to a specific location in the user interface (e.g., at a text field) or by typing in a pre-defined command (e.g., command-return on a keyboard). Doing so, as depicted in FIG. 9A, will display a popup menu 13 that lists all the output nodes 14 in the node storage component 230 associated with the current document. As shown in FIG. 9A, the popup menu 13 may also provide an option for adding a new prompt. As shown in FIG. 9A, each node is represented in the menu by its dialog 15 and any additional identifying information, e.g., the node's name 16. The author may then select the desired output node 17 from the menu and it will be assigned as the destination of the preceding input node, replacing any output node previously assigned as a destination. The author may make the selection by using a pointing device to click on one of the lines of text 15 or by, for example, using the up-arrow and down-arrow keys on a keyboard to highlight the desired output node 17 from the displayed menu. As shown in FIG. 9B, the system 200 will then replace any Character or Player dialog below that point in the script with the Character dialog associated with the new output node and any subsequent Player or Character dialog that followed it the last time that output node was displayed 18.

Figure 10A:
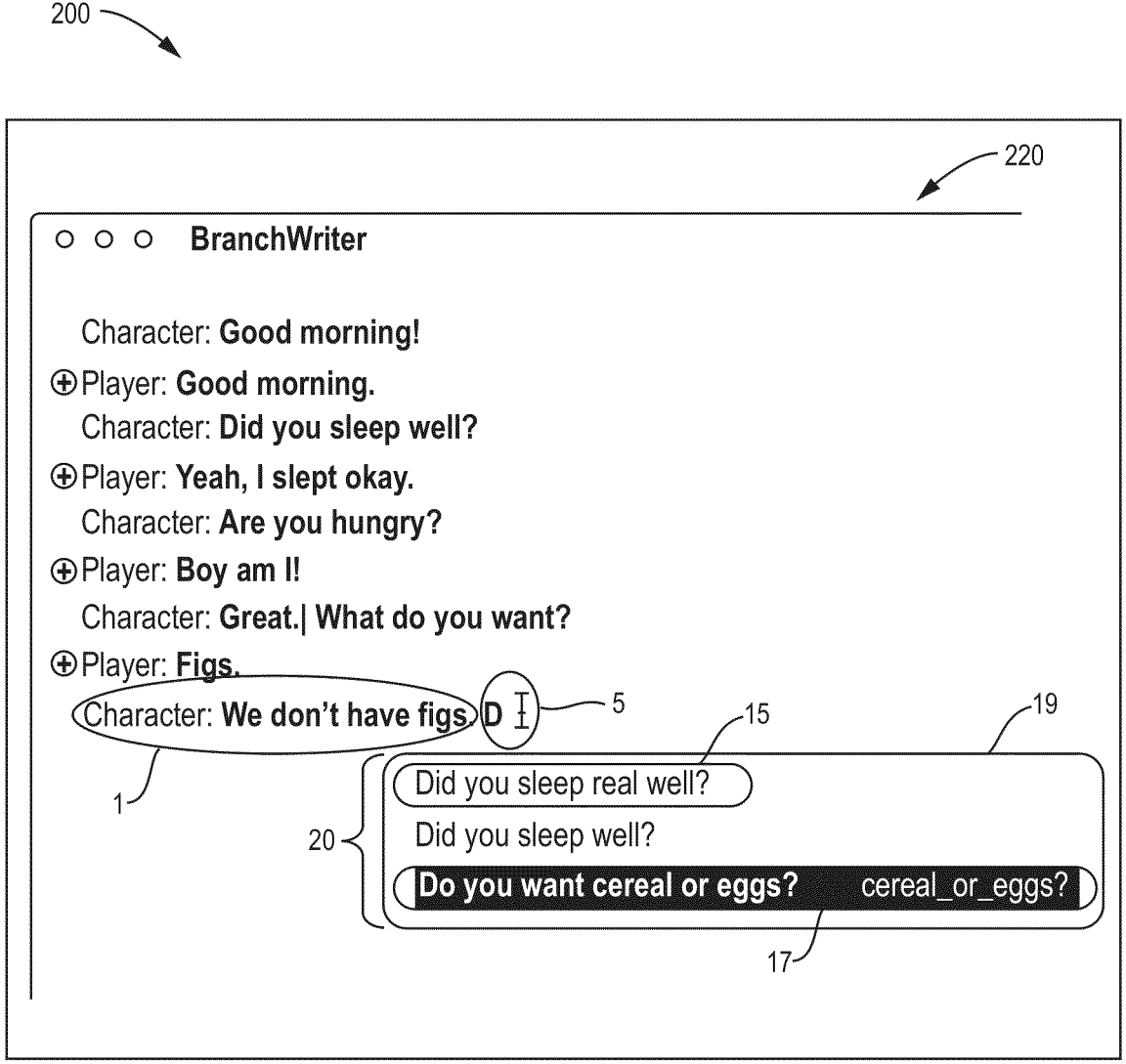
FIGS. 10A-10B are block diagrams depicting one embodiment of a user interface depicting an autocomplete menu from which a user may select an existing output node as a branch destination in a system for generating and selectively displaying portions of scripts for nonlinear dialog between at least one computing device and at least one user.
Figure 10B:
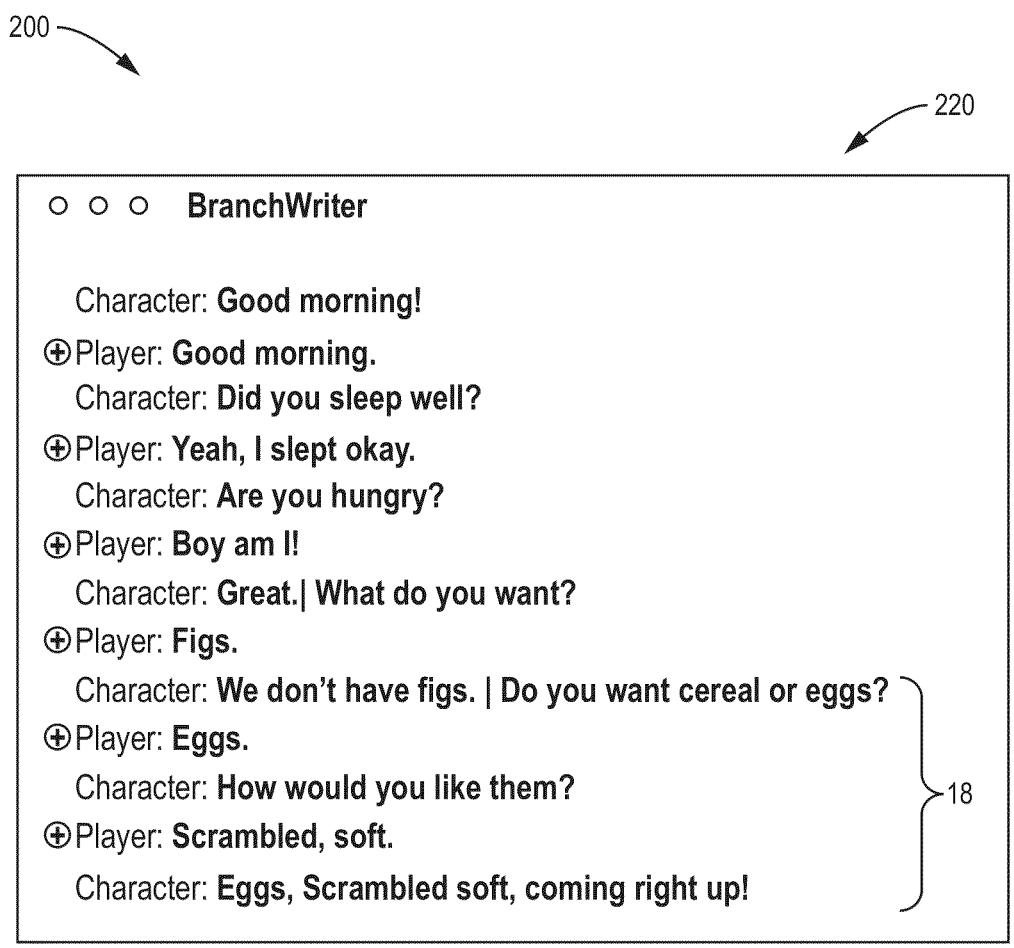

As depicted in FIG. 10A, the system 200 may provide an "autocomplete" menu, populated with options for completing dialog selected from all the dialog contained in the output nodes in the node storage component 230. As the author types text into the text field, the autocomplete menu 19 pops up, showing only the options 20 whose dialog is a completion of what the author has typed based on previously typed text (e.g., the letter D at 5 in FIG. 10A). The author may then use the up-arrow and down-arrow keys on keyboard or a pointing device to select the desired output node 17 from the menu. When the author presses "return," the user interface engine 210 assigns the selected output node as the destination of the preceding input node, replacing any output node previously assigned as a destination. As depicted in FIG. 10B, the user interface engine 210 may then replace any character or player dialog below that point in the script in the display in user interface 220 with the character dialog associated with the new output node, as well as any subsequent player or character dialog that followed it the last time that output node was displayed 18.

Figure 11A:
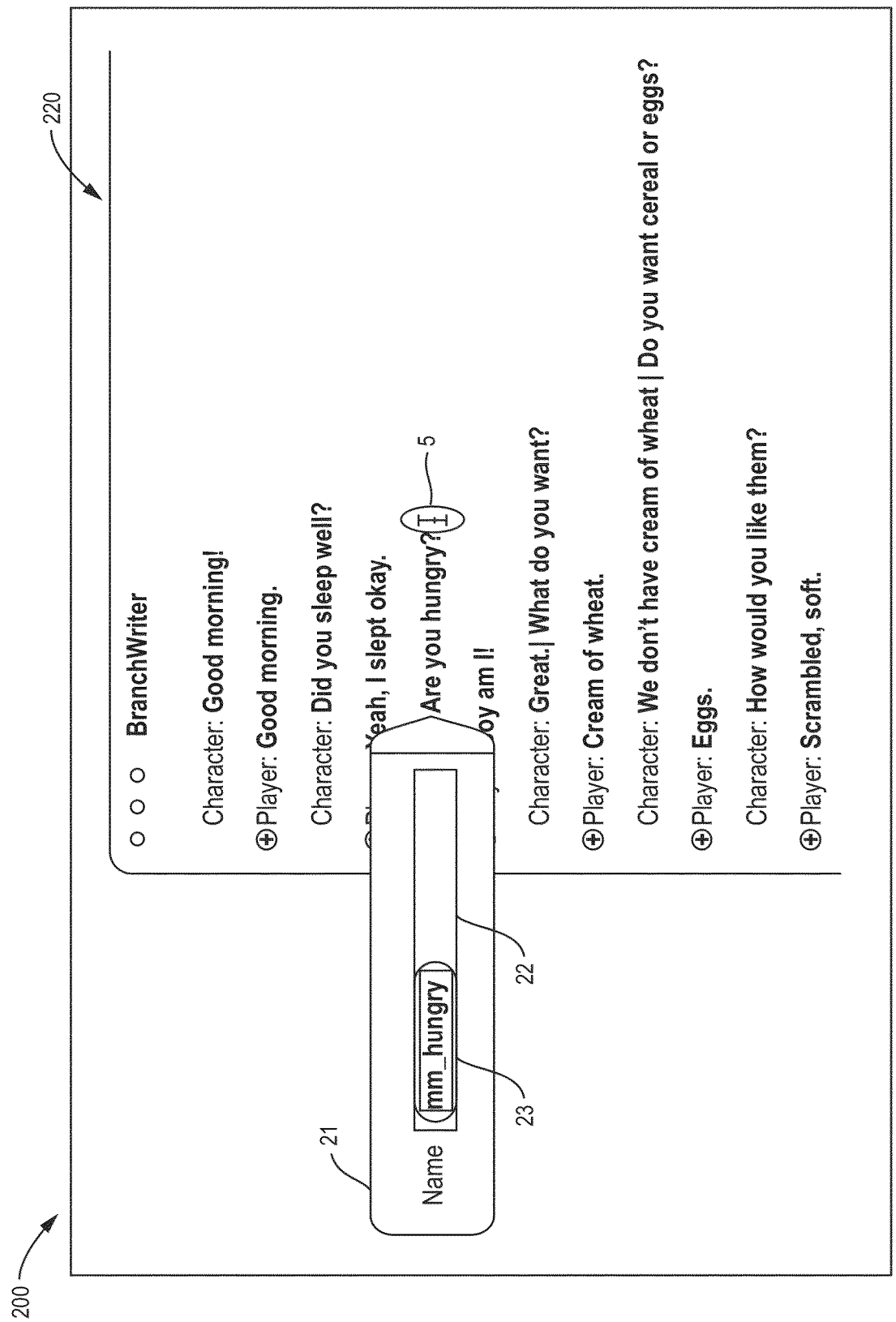
FIGS. 11A-11B are block diagrams depicting one embodiment of a user interface with which a user may assign a name to an output node in a system for generating and selectively displaying portions of scripts for nonlinear dialog between at least one computing device and at least one user.
Figure 11B:
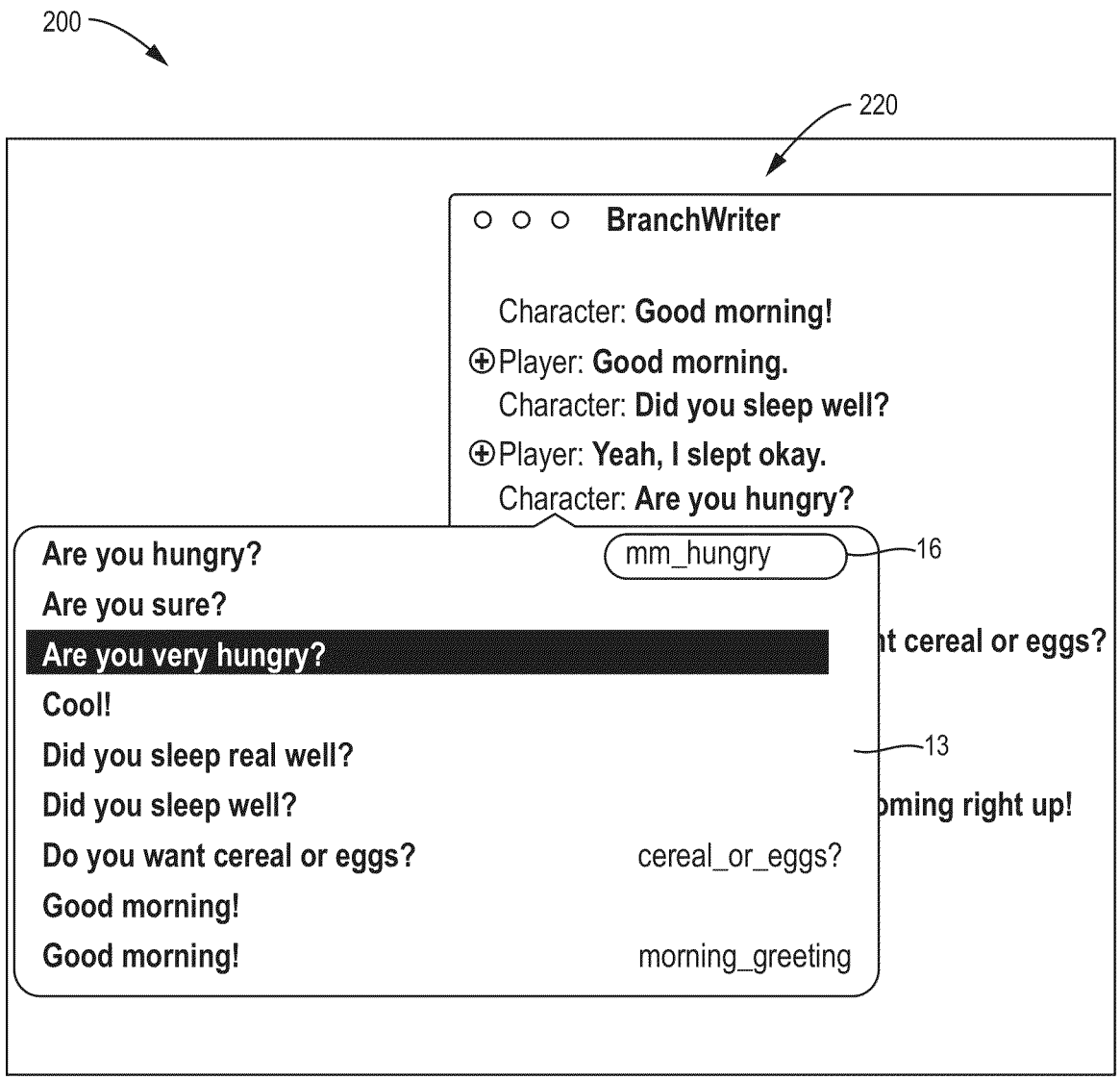

Since it is possible for multiple output nodes to contain the same dialog, the system includes functionality with which the user may assign a name to an output node to help differentiate the nodes and facilitate easier selection from the menus. As depicted in FIG. 11A, the author can name any node by moving the text-insertion cursor 5 to the desired Character line and typing, for example, without limitation, the "#" character (this character is configurable). Doing so causes a popup 21 to appear containing a text field 22 that displays the node's name 23. The author can then enter or edit the node's name and press "return" on keyboard 207 when done. This name 16 will then appear in the any menus 13 to aid in identification of the node, as depicted in FIG. 11B.

Often, the text for a character's response to a player's input contains a portion of dialog that is a specific response to the player's dialog, and a separate portion that is a new question or prompt that entices the player to respond again. For example, in the dialog depicted in FIG. 10B, the character asks, "Are you hungry?", the player responds, "Boy am I!", and the character responds to that with: "Great! What do you want?". "Great!" is a specific response to the player's input, "Boy am I!" and "What do you want?" is the new prompt that the Character would say regardless of the Player's input. The user interface engine 210 therefore provides functionality for the author to associate specific portions of the computer-controlled character's dialog to either the output node or the user-input node that preceded it, to allow for greater specificity in dialog while maintaining reusability of the output node. The user interface engine 210 may accomplish this by designating a special character (in one embodiment, the "I" character) which the author may place anywhere within the text field associated with an output node. Any text to the left of the delimiter will be associated with the preceding input node; any text to the right will be associated with the output node. In cases where multiple branches share the same destination output prompt, the system provides functionality to correctly associate the specific response with the input node and the new prompt with the output node. Such functionality allows the author to indicate which portion of the content should be associated with the input node and which portion should be associated with the output node by simply typing a delimiter character such as "I" (this character is configurable). This approach allows the author to easily modify the position of the delimiter and thereby reassign content from the input node to the output node (or vice-versa) without having to copy and paste text from one field to another.

Since it is possible for an output node to be the destination of multiple input nodes, there may be multiple specific responses that can appear before the prompt text. When displaying text for such an output node, the system only displays the response text associated with the currently visible input node that precedes said output node.

Using the above methods, the author is able to create linear portions of the dialog tree, create dialog branches to be triggered based on input, and merge those branches back together at an output node.

Figure 12A:
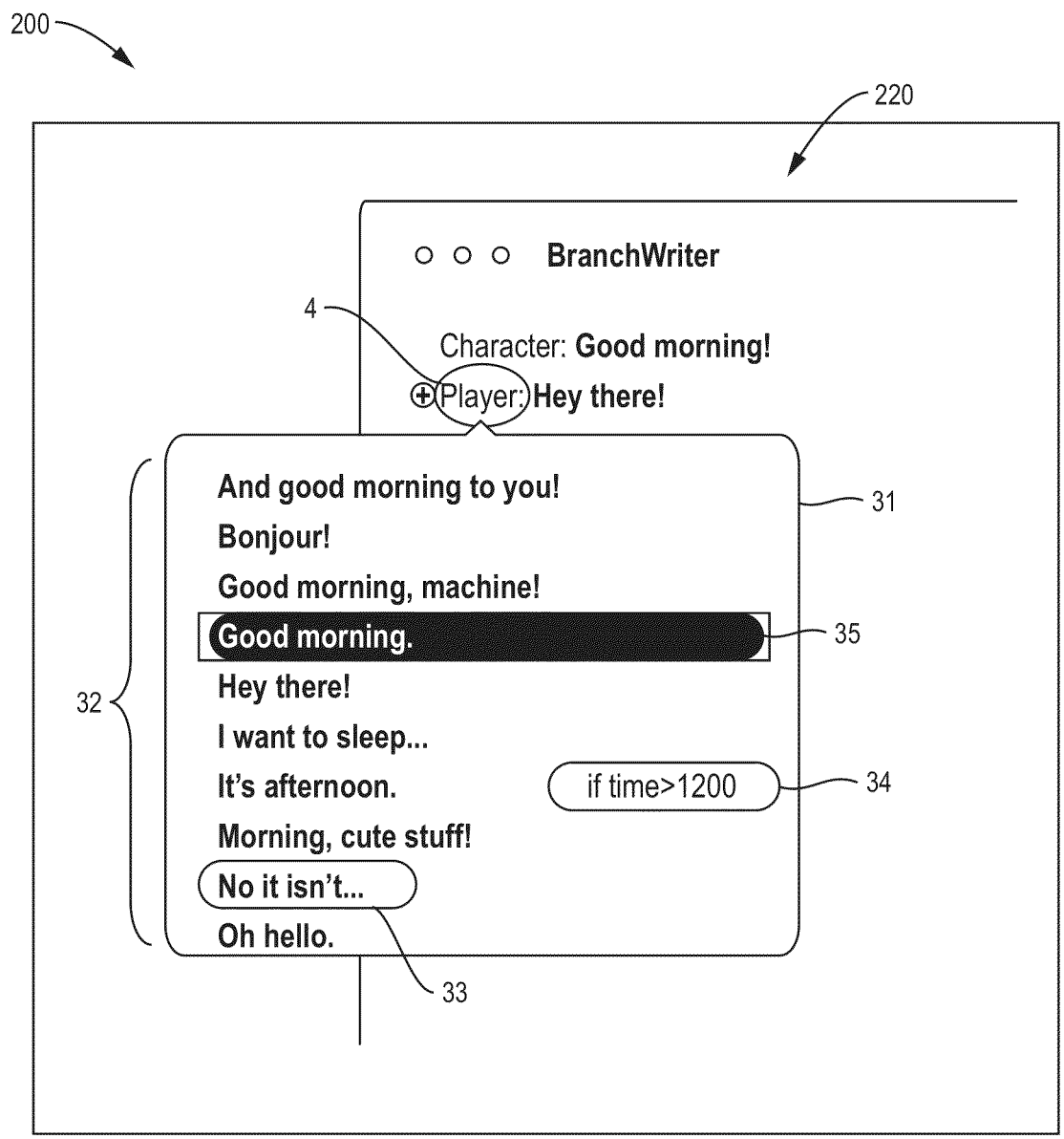
FIGS. 12A-12B are block diagrams depicting one embodiment of a user interface with which a user may change a view from one dialog branch to another in a system for generating and selectively displaying portions of scripts for nonlinear dialog between at least one computing device and at least one user.
Figure 12B:
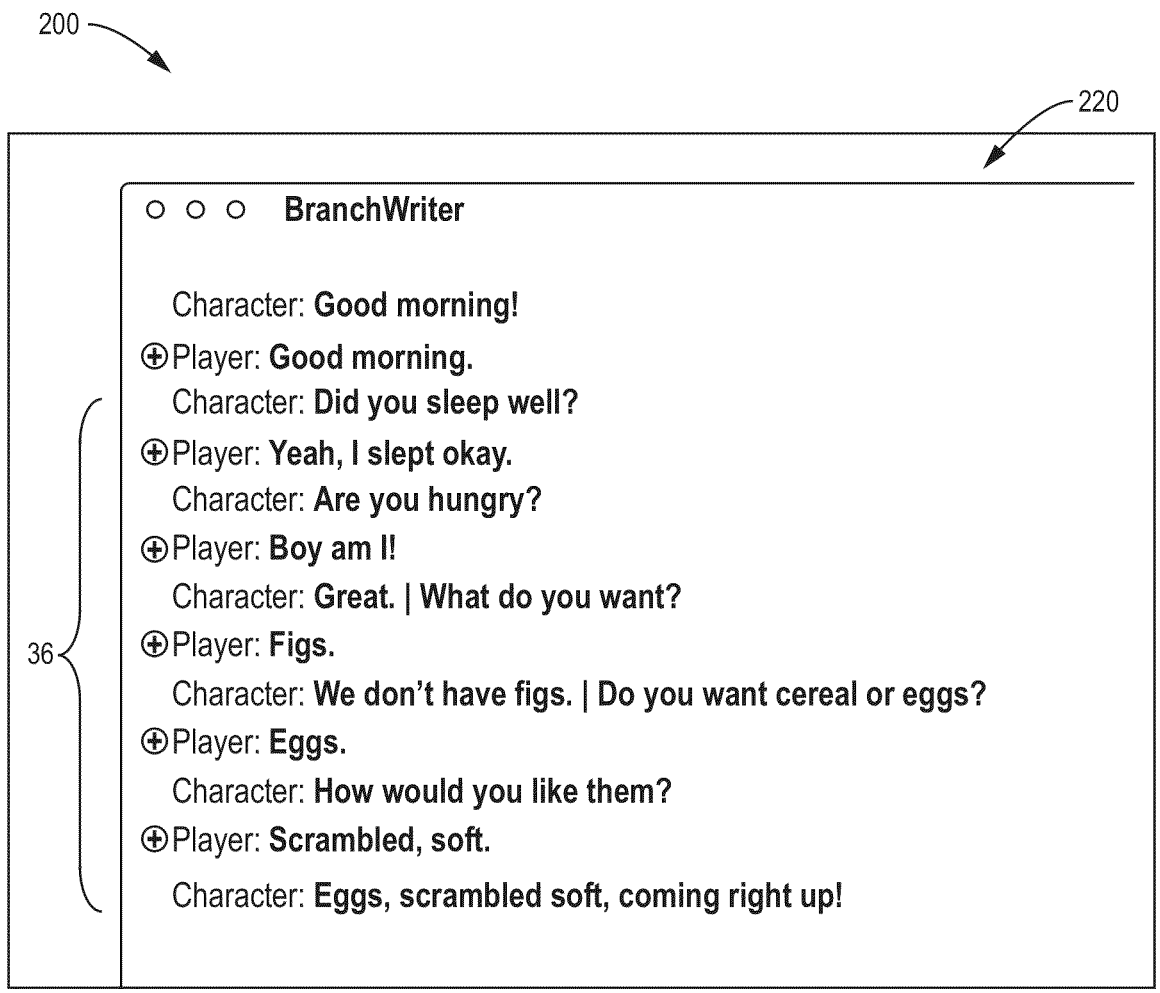

The system 200 provides functionality that allows an author to alternate between displays of different dialog branches determined by the player's input when creating and revising the flow of the interaction. As depicted by FIG. 12A, when the author clicks on the "Player:" prompt text 4, (or by navigating the text-insertion cursor to the desired input node and pressing a command key on a keyboard associated with showing the branch selection popup menu, e.g., Command-Return, as described above) the user interface 220 displays a popup menu 31 that lists all the input nodes 32 in the node storage component 230 that are children of the current input node's parent node. Each of these sibling nodes is represented in the menu by its dialog 33 and any additional identifying information, e.g., the node's conditions 34. The author may then select the desired player input node 35 from the menu and the system will replace the player dialog with the sibling node's player dialog, as shown in FIG. 12B, as well as any dialog below that point in the dialog with the character dialog associated with the new input node's destination output node and any subsequent player or character dialog that followed it the last time that input node was displayed 36.

The system 200 continues to store the selected child user-input node for each output node in the internal storage system 204 even when the output node is hidden from view due to being contained in a branch that is not currently selected. This allows the system 200 to reconstruct the most-recently viewed path past any branch point, allowing the author to quickly view the resulting series of interactions based on a change at a single branch point.

Figure 13:
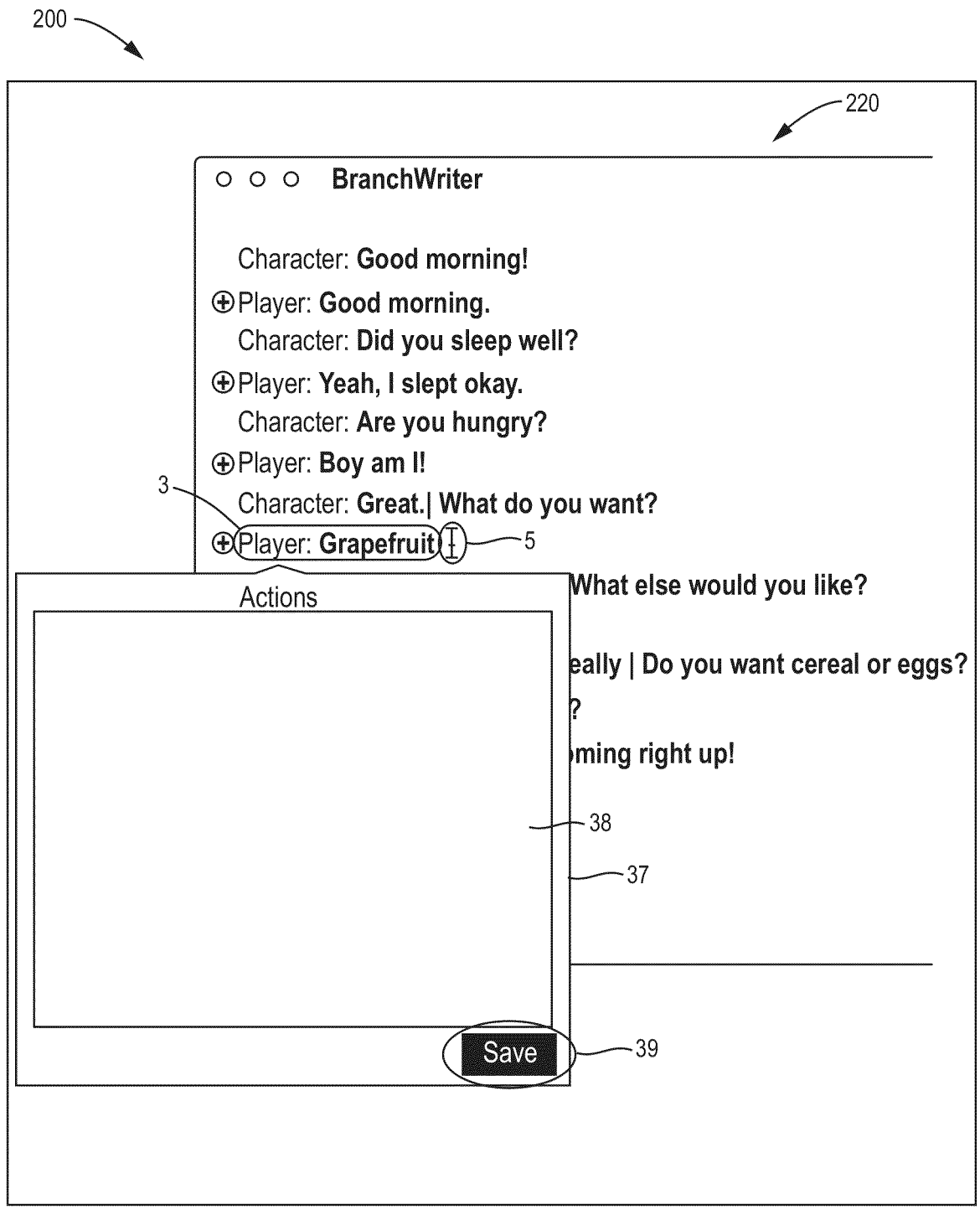
FIG. 13 is a block diagram depicting one embodiment of a user interface with which to assign a set of actions to a node in a system for generating and selectively displaying portions of scripts for nonlinear dialog between at least one computing device and at least one user.

Often, state updates need to be made based on the Player's input or the traversal of a particular output node. FIG. 13 is a block diagram depicting one embodiment of a user interface with which to assign a set of actions to a node. As shown in FIG. 13, the author may move the text-insertion cursor 5 to the dialog line 3 corresponding to the desired node and typing a predefined command, such as, by way of example, without limitation, the "@" character (this is configurable). Doing so causes a popup 37 to appear containing a text field 38 that displays the node's current actions. Actions may include, without limitation, setting a value of a variable that can be used as a condition on a later branch, executing a function in a computer language such as Lua or Javascript, or sending a specified message to another process on the same computer or to a computer on the network (e.g., a local network, wide area network, or other network). The author can then enter or edit the node's conditions and press the "Done" button 39 or Command-Return on a keyboard when done. As will be understood by those of skill in the art, the above method can be extrapolated to assign additional desired attributes to any node.

Figure 14:
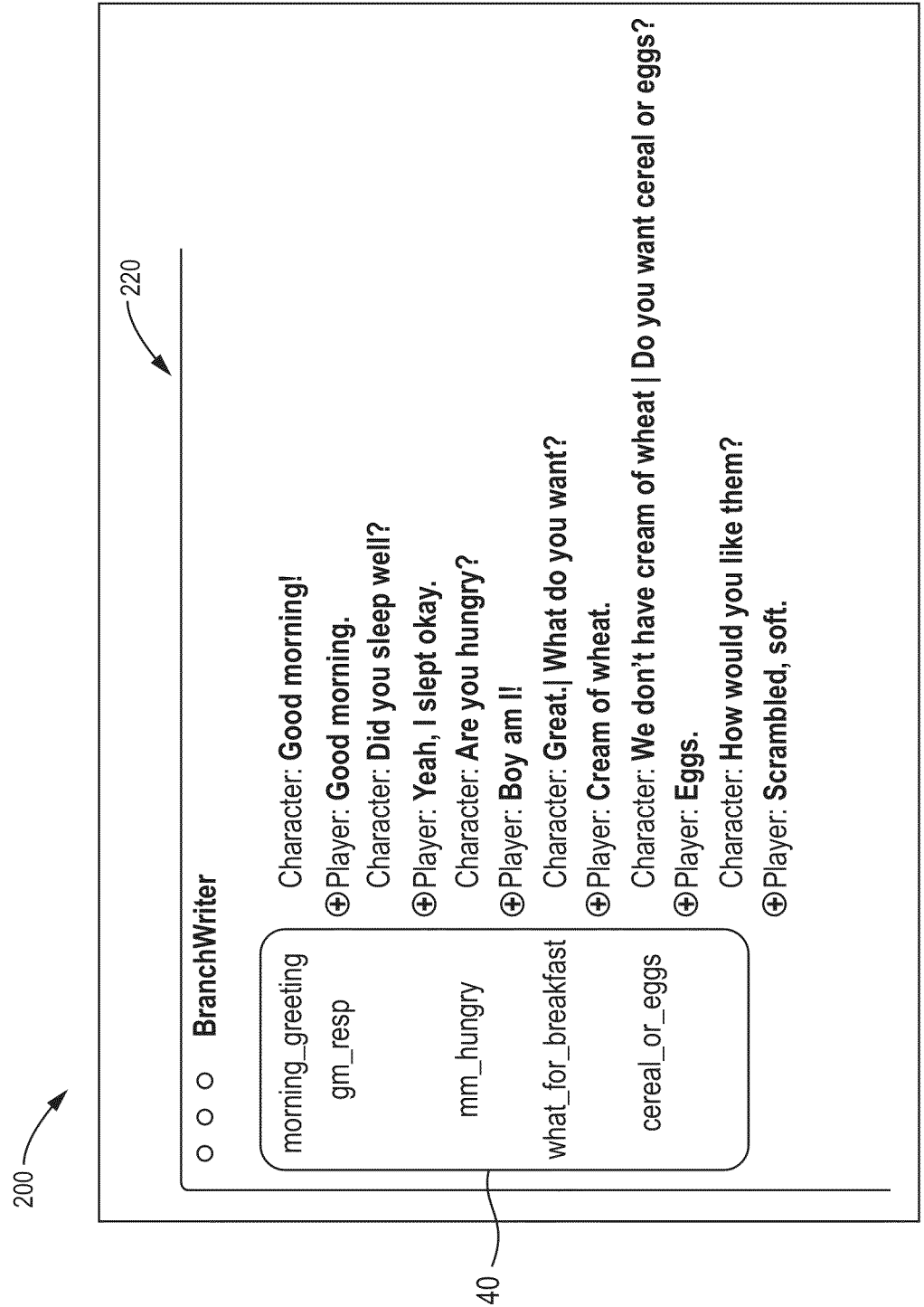
FIG. 14 is a block diagram depicting one embodiment of a user interface displaying node names in addition to text from nodes in a system for generating and selectively displaying portions of scripts for nonlinear dialog between at least one computing device and at least one user.
Figure 15:
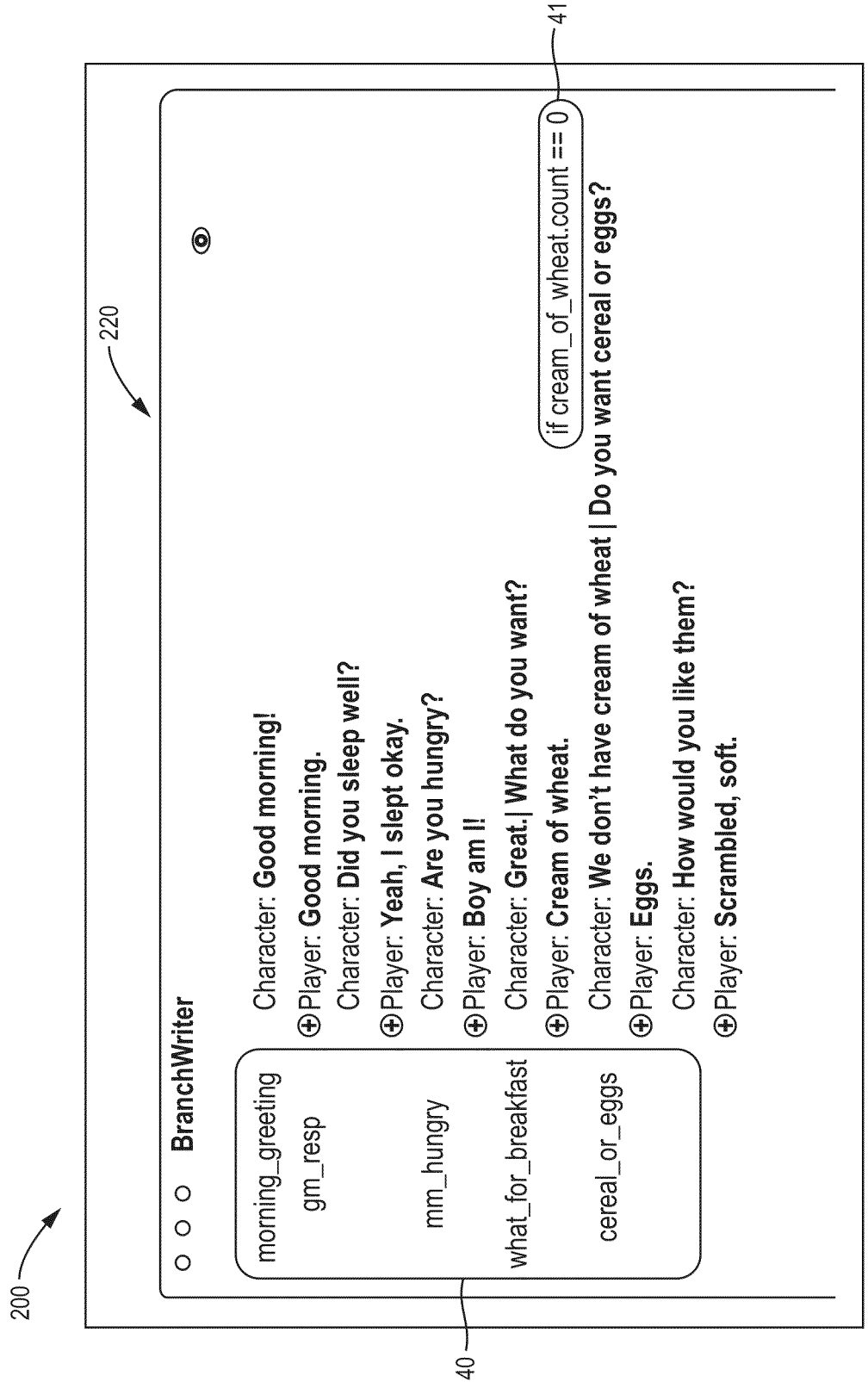
FIG. 15 is a block diagram depicting one embodiment of a user interface displaying node names in addition to text from nodes and conditions associated with nodes in a system for generating and selectively displaying portions of scripts for nonlinear dialog between at least one computing device and at least one user.

While the default configuration of the current embodiment shows only dialog, the author may opt to show additional information alongside the lines of dialog, e.g., the node names 40 associated with certain lines (FIG. 14), or the conditions 41 associated with a player-input node (FIG. 15). Each of these groups of information may be toggled on and off by the author via a menu selection or key command.

Figure 16:
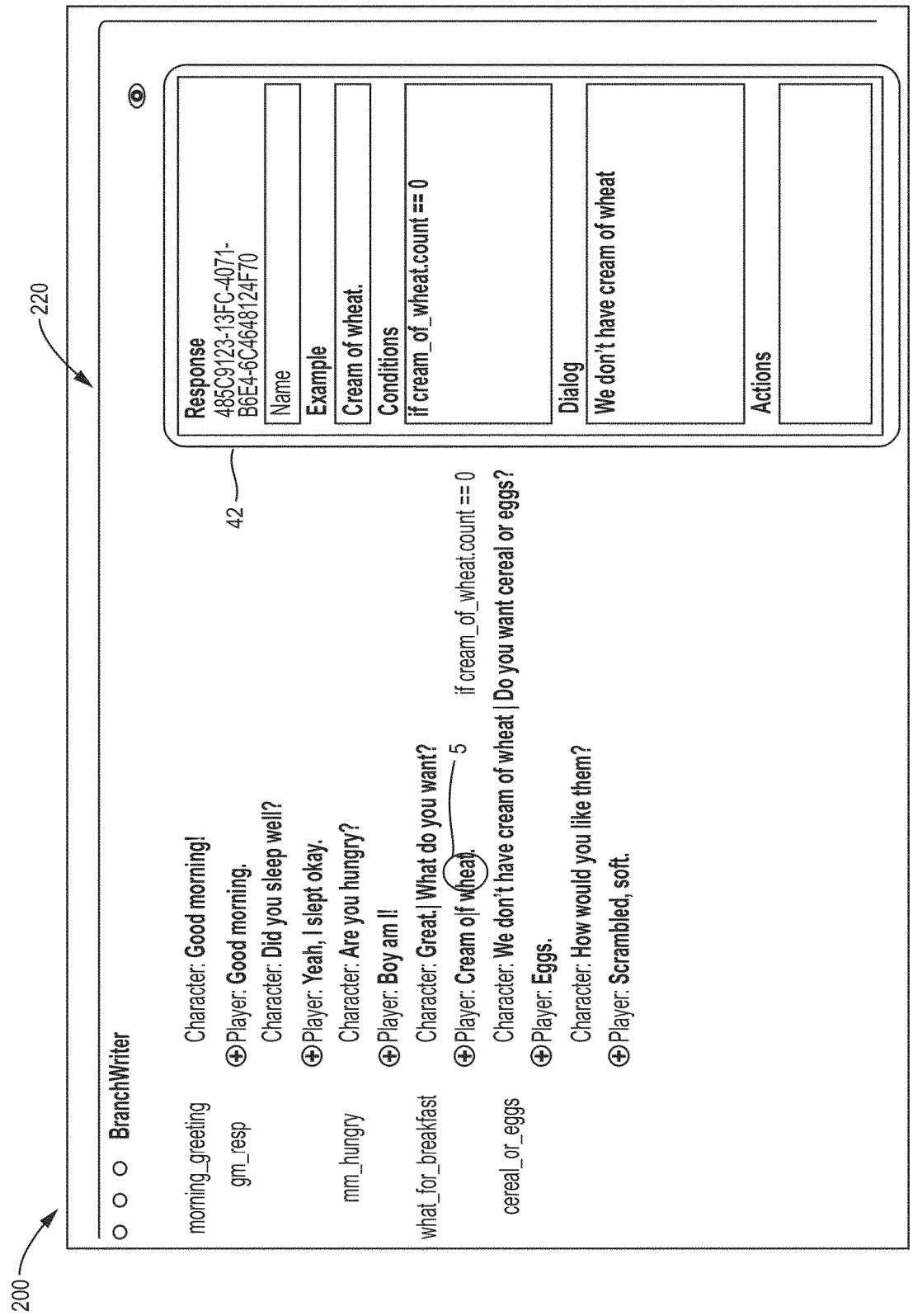
FIG. 16 is a block diagram depicting one embodiment of a user interface displaying node names and node metadata in addition to displaying text from nodes in a system for generating and selectively displaying portions of scripts for nonlinear dialog between at least one computing device and at least one user.

It is often desirable to see all the attributes and metadata associated with a node. To facilitate this (FIG. 16), the current embodiment allows the author to display an "inspector" panel 42. As the author moves the text-insertion cursor to different lines of dialog, the inspector panel updates to display the data and attributes associated with the node that corresponds to the line.

Figure 17:
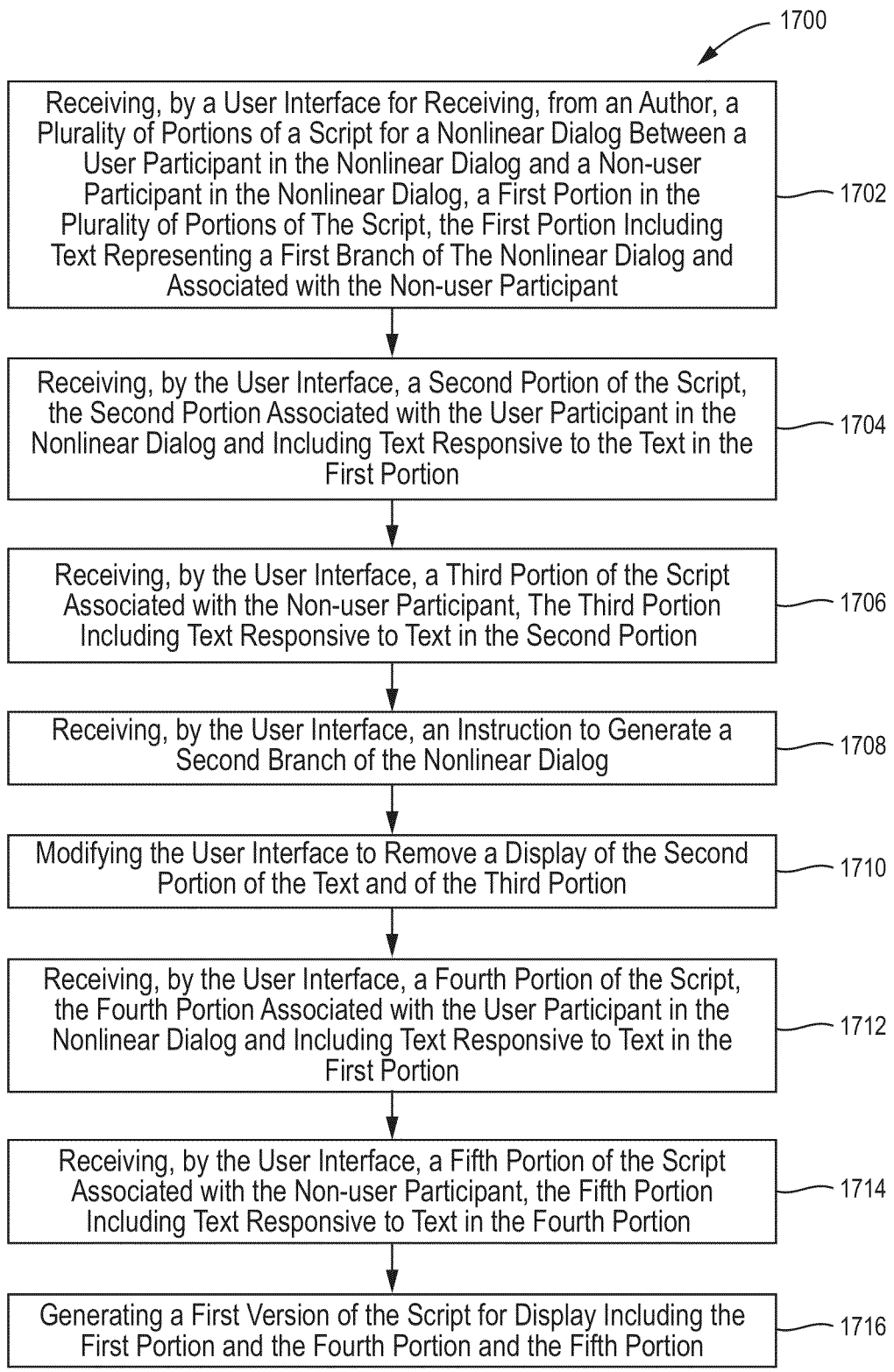
FIG. 17 is a flow diagram depicting an embodiment of a method for generating and selectively displaying portions of scripts for nonlinear dialog between at least one computing device and at least one user.

Therefore, the methods and systems described herein provide functionality for generating and selectively displaying portions of scripts for nonlinear dialog between at least one computing device and a user. Referring now to FIG. 17, in brief overview, a flow diagram depicts one embodiment of a method 1700 for generating and selectively displaying portions of scripts for nonlinear dialog between at least one computing device and a user. The method 1700 includes receiving, by a user interface for receiving from an author a plurality of portions of a script for a nonlinear dialog between a user participant in the nonlinear dialog and a non-user participant in the nonlinear dialog, a first portion in the plurality of portions of the script, the first portion including text representing a first branch of the nonlinear dialog and associated with the non-user participant (1702). The method 1700 includes receiving by the user interface, a second portion of the script, the second portion associated with the user participant in the nonlinear dialog and including text responsive to the text in the first portion (1704). The method 1700 includes receiving, by the user interface, a third portion of the script associated with the non-user participant, the third portion including text responsive to text in the second portion (1706). The method 1700 includes receiving, via the user interface, an instruction to generate a second branch of the nonlinear dialog (1708). The method 1700 includes modifying the user interface to remove a display of the second portion of the text and of the third portion (1710). The method 1700 includes receiving, by the user interface, a fourth portion of the script, the fourth portion associated with the user participant in the nonlinear dialog and including text responsive to text in the first portion (1712). The method 1700 includes receiving, by the user interface, a fifth portion of the script associated with the non-user participant, the fifth portion including text responsive to text in the fourth portion (1714). The method 1700 includes generating a version of the script for display including the first portion and the fourth portion and the fifth portion (1716).

Referring now to FIG. 17, in greater detail and in connection with FIGS. 2A-16, the method 1700 includes receiving, via a user interface for receiving, from an author, a plurality of portions of a script for a nonlinear dialog between a user participant in the nonlinear dialog and a non-user participant in the nonlinear dialog, a first portion in the plurality of portions of the script, the first portion including text representing a first branch of the nonlinear dialog and associated with the non-user participant (1702). Receiving the first portion may include receiving an indication that the first portion represents the at least one branch of the nonlinear dialog. The method 1700 may include storing the text of the first portion in a first node of a branching dialog tree; for example, the user interface engine 210 may store the text in a first node in the node storage component 230. The user interface engine 210 may indicate that the first node is an output node (e.g., to be output by the character).

As indicated above, the user interface engine 210 may receive the instruction to generate a new branch or the indication that the first portion includes text representing a first branch from the user interface 220 in several ways. As described above, for example, the author may press (e.g., via a pointing device) an onscreen button situated just to the left of the "Player:" prompt or the author may navigate the text-insertion cursor to the player's dialog line and then press a command key on a keyboard associated with branch creation, e.g., without limitation, Command-Plus sign. As another example, the author may touch a point on a touch-sensitive screen. As a further example, the author may issue a voice command.

The method 1700 includes receiving by the user interface, a second portion of the script, the second portion associated with the user participant in the nonlinear dialog and including text responsive to the text in the first portion (1704). As described above in connection with FIG. 2B, the method 1700 may include storing the text of the second portion in a second node of a branching dialog tree; for example, the user interface engine 210 may store the text in a second node in the node storage component 230. The user interface engine 210 may indicate that the second node is an input node (e.g., input to the system 200, to be received from a player).

The method 1700 includes receiving, by the user interface, a third portion of the script associated with the non-user participant, the third portion including text responsive to text in the second portion (1706). The method 1700 may include storing the text of the third portion in a third node of a branching dialog tree; for example, the user interface engine 210 may store the text in a third node in the node storage component 230. The user interface engine 210 may indicate that the third node is an output node (e.g., to be output by the character). As described above in connection with FIG. 2B, when the author again presses the return key on the keyboard, the user interface 220 automatically displays text on the following line containing the name of the character (or "Character:") and again places the text-insertion cursor to its right; the author can then type the computer character's response to the user. The user interface engine 210 then create another dialog node (e.g., the third node), linking it as the destination of the previous user-input node and defining it as an output node to be executed when the user says the dialog specified in the text field of the previous user-input node.

After receiving the third portion, the user interface engine 210 may display a user interface element including a menu of alternative phrasing of the text in the third portion. For example, the user interface engine 210 may execute a localization component (not shown) that provides alternative versions of the text for use in different countries—for example, receiving text in American English and providing an alternative phrasing in British English.

During the receiving of the text of the third portion, after receiving a subset of the text of the third portion, the user interface engine 210 may display a user interface element including recommended text for addition to the subset. As depicted in FIG. 10A-B, the system 200 may provide functionality for displaying auto-completion recommendations that allow the author to select text from a previously generated node to complete the text the author has begun typing. Those recommendations may include recommendations to include the text from other child nodes previously entered and associated with the text the author selected.

Receiving the third portion of the text may include receiving an identification of a condition for satisfaction prior to inclusion of the third portion in the script. For example, as depicted in FIG. 8, an author may specify that a variable must be associated with a particular value before the text of the third portion should be included in the script—as shown in FIG. 8, the author has specified that the value of variable related to a count for units of cream of wheat should equal zero before inclusion in the script of the output text "We don't have cream of wheat." The user interface engine 210 may identify a node in the branching dialog tree storing the text of the third portion of the script and associated the identified node with the identified condition.

The method 1700 may include storing a first subset of the text of the third portion in a first child node of the second node; identifying the first child node of the second node as an input node; storing a second subset of the text of the third portion in a second child node of the second node; and identifying the second child node of the second node as an output node.

The method 1700 includes receiving, via the user interface, an instruction to generate a second branch of the nonlinear dialog (1708). As indicated above, the user interface engine 210 may receive the instruction when, for example, the author presses (e.g., via a pointing device) an onscreen button or other user interface element situated just to the left of a prompt, or the author may navigate the text-insertion cursor to a specific dialog line and then press a command key on a keyboard associated with branch creation, e.g., without limitation, typing Command-Plus. As another example, the author may touch a point on a touch-sensitive screen. As a further example, the author may issue a voice command.

The method 1700 includes modifying the user interface to remove a display of the second portion of the text and of the third portion (1710). As depicted above in connection with FIGS. 5A-C, the user interface engine 210 may modify the user interface 220 to remove the initial lines of text entered by the author in connection with the first branch of dialog and display only lines of text entered subsequent to the receipt of the instruction to generate the second branch.

The method 1700 includes receiving, by the user interface, a fourth portion of the script, the fourth portion associated with the user participant in the nonlinear dialog and including text responsive to text in the first portion (1712). The method 1700 includes receiving, by the user interface, a fifth portion of the script associated with the non-user participant, the fifth portion including text responsive to text in the fourth portion (1714).

Referring again to FIGS. 18A-18B, FIG. 18A provides a visual example of the first branch with the second portion and the third portion—the branch in which in response to the character line of dialog "Good morning!", the player says, "Hey there!" and the character is to respond, "Hey Indeed!". Upon receiving the instruction to generate a second branch and then receiving the fourth and fifth portions, the second branch, as depicted in FIG. 18B, includes the character line of dialog "Good morning" followed by the player line of "Good morning." and the character output line of "Did you sleep well?"

Referring back to FIG. 17, the method 1700 may include one or more steps for validating a branch of the dialog tree. For example, the user interface engine 210 may receive a command to validate the first branch and then analyze each node in the first branch of the branching dialog tree to identify a subset of the nodes in the branching dialog tree associated with at least one condition before determining whether the at least one condition satisfies at least one requirement for a valid condition. For example, if a condition specifies a value of a variable should be zero before certain text is output (as in the example above, that the value of a count of units of cream of wheat be zero before displaying text saying "We don't have cream of wheat"), the user interface engine 210 may analyze each descendant node associated with the a node associated with the "cream of wheat count=0" condition to confirm that none of the descendant nodes are associated with a condition that the count for cream of wheat units be greater than zero. For example, if a subsequent node is associated with a condition that the count for cream of wheat units be equal to one before stating "You are lucky—we've got one left!", the user interface engine 210 may determine that the subsequent node should not be considered a valid descendant node of the node that has already set a condition indicating there should not be any units of cream of wheat available and may generate a warning to the author that there is a conflict between the conditions in response to the instruction to validate the branch of the dialog tree.

The method 1700 includes generating a version of the script for display including the first portion and the fourth portion and the fifth portion (1716). Before generating the version of the script, the user interface engine 210 may receive, via the user interface 220, an instruction to generate the version of the script representing the second branch of the nonlinear dialog. The user interface engine 210 may receive, via the user interface 220, an instruction to generate a second version of the script representing the first branch of the nonlinear dialog. The user interface engine 210 may then generate a second version of the script for display including the first portion and the second portion and the third portion.

Generating the script may include providing the author with a copy of the branch or branches of dialog that the user interface 220 is depicting at the time of receiving the request; for example, the author may have the option of downloading the displayed text to a word processing document. As another example, the author may have the option of exporting the displayed text to another type of script editing application. As a further example, the author may have the option of exporting the displayed text to an application for recording scripts; for example, the user interface engine 210 may export all the lines of dialog associated with a specific character so that a voice actor may record the lines of dialog to be played aloud during an execution of the script. In some embodiments, there are multiple characters and the author may provide instructions to generate versions of the script for just one of the characters, a subset of the characters, or all the characters. As will be understood by those of ordinary skill, the displayed lines of text shown by the user interface 220 may be considered a display of the script; therefore, when the user interface engine 210 modifies the user interface 220 to display different lines of text retrieved from different nodes in the dialog tree, the modified display may be considered a different version of the script. However, the instruction to generate the script may also specify that the script should be exported to a different format specified by the author, whether printed, saved to a word processing document, exported to a different application, exported to different applications via interfaces such as JSON interfaces, exported to third party systems, exported to backend systems, exported into a scripting language or compiled into code—the generation of the script requested by the user is not limited to modifying the user interface 220.

The method 1700 may include generating a version of the script including only the lines of dialog for the non-user participant (e.g., the character). By way of example, the user interface engine 210 may identify the lines of dialog for the non-user participant that are displayed in the user interface 220 at the time of receiving a request to generate the version of the script and extract that identified text from the node structure 230 to a file available for export to, for example and without limitation, an application for generating audio recordings where an actor may record the exported lines of dialog. As another example, the user interface engine 210 may extract the identified lines of dialog to a word processing document and provide the document to the author.

Figure 19:
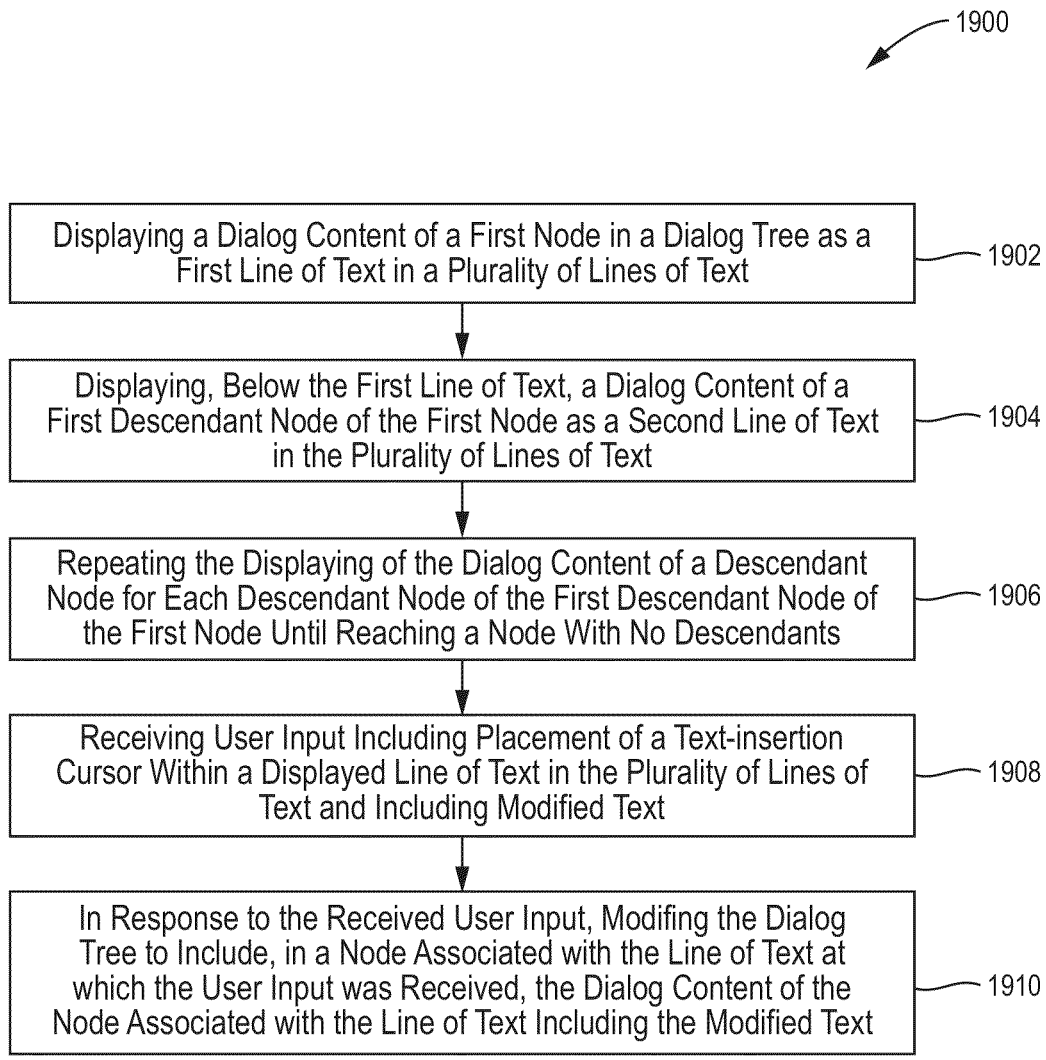
FIG. 19 is a flow diagram depicting one embodiment of a method for displaying and modifying a branching dialog tree which contains at least one node representing dialog of at least one computer-controlled character and at least one node representing the input of at least one user.

Referring now to FIG. 19 in brief overview, the methods and systems described herein may therefore include a method 1900 of displaying and modifying a branching dialog tree which contains at least one node representing dialog of at least one computer-controlled character and at least one node representing the input of at least one user, the method including displaying a dialog content of a first node in a dialog tree as a first line of text in a plurality of lines of text (1902). The method 1900 includes displaying, below the first line of text, a dialog content of a first descendant node of the first node as a second line of text in the plurality of lines of text (1904). The method 1900 includes repeating the displaying of the dialog content of a descendant node for each descendant node of the first descendant node of the first node until reaching a node with no descendants (1906). The method 1900 includes receiving user input including placement of a text-insertion cursor within a displayed line of text in the plurality of lines of text and including modified text (1908). The method 1900 includes, in response to the received user input, modifying the dialog tree to include, in a node associated with the line of text at which the user input was received, the dialog content of the node associated with the line of text includes the modified text (1910). As depicted in FIG. 19, therefore, when the author provides an instruction to merge a branch in the dialog tree back to an existing output node, the user interface engine 210 enables this functionality. In one embodiment, when the author "clicks" on a button embedded within the text of any output node, e.g., within the "Character:" text, or on a distinct button associated with each output node, the user interface engine 210 presents a popup menu in the user interface, listing the dialog for all, or a filtered subset of, the existing output nodes. The author may then select an output node to be the previous input node's destination. Doing so replaces the dialog text to the right of the "Character:" (if any) with that of the selected output node, and the user interface engine 210 assigns the selected node as the destination of the preceding user-input node. The user interface engine 210 also replaces the text that appeared below the selected output node with the text of the most-recently displayed children and further descendants of the output node. In another embodiment, the author first selects an output node by navigating the text-insertion cursor to the desired "Character:" line and pressing a command key on the keyboard or selecting a menu command to make the popup menu appear, or in an alternative implementation, the line of text to the right of "Character:" would disappear and the author could select an existing output node by beginning to type the dialog of the desired existing output node into the empty text area and then selecting the node from an autocomplete menu. Using either of these methods has the same result as clicking the button described in the embodiment above.

If the author instructs the user interface engine 210 to replace the existing destination node that follows a user-input node with a new output node, the author may use the methods described immediately above but choose "New destination" from the popup menu, or simply type dialog for the new node (without choosing an existing node from the autocomplete menu).

Referring now to FIG. 19, in greater detail and in connection with FIGS. 2-18 and 21A-B, the method 1900 includes displaying a dialog content of a first node in a dialog tree as a first line of text in a plurality of lines of text (1902). The method 1900 includes displaying, below the first line of text, a dialog content of a first descendant node of the first node as a second line of text in the plurality of lines of text (1904). The method 1900 may include displaying each line of text in a separate editable text field. The method 1900 may include displaying lines of text associated with a single dialog turn within the same editable text area. The method may include 1900 displaying all lines of text within the same editable text area.

The method 1900 includes repeating the displaying of the dialog content of a descendant node for each descendant node of the first descendant node of the first node until reaching a node with no descendants (1906).

The method 1900 may include selecting which descendant node is displayed when a node possesses multiple descendant nodes based on when the descendant nodes were most recently displayed. The method 1900 may include selecting which descendant node is displayed when a node possesses multiple descendant nodes based on a random selection. The method 1900 may include selecting which descendant node is displayed when a node possesses multiple descendant nodes based on a previously-stored configuration (e.g., a configuration storing a display instruction). The method 1900 may include selecting which descendant node is displayed when a node possesses multiple descendant nodes based on the order of the creation of the descendant nodes. The method 1900 may include associating the first node with at least one condition. The method 1900 may associate the first node with the at least one condition prior to displaying the dialog content for any descendant nodes of the first node. The method 1900 may include allowing each node to modify other values of the node storage component 230 per a set of commands associated with it prior to displaying its descendant node; as a result, selecting which descendant node is displayed when a node possesses multiple descendant nodes may be determined by the result of logical conditions evaluated based on the values of the internal storage system as a result of sequentially evaluating the commands in its ancestor nodes. The method 1900 may preferentially displays a node's highest priority descendant whose logical conditions are completely satisfied. If none of the node's descendant nodes have all their logical conditions completely satisfied, the method 1900 may include displaying one of the descendants whose conditions are not completely satisfied; the method 1900 may including displaying the descendant node in a visually distinct manner to indicate that its conditions are not entirely satisfied. Determining which descendant is displayed is determined entirely or partially by the priority assigned to the descendant, which may be determined entirely or partially by the number or percentage of satisfied conditions.

The method 1900 includes receiving user input including placement of a text-insertion cursor within a displayed line of text in the plurality of lines of text and including modified text (1908). As indicated above, instead of receiving an indication of a placement of the text-insertion cursor, the user interface engine 210 may receive a command via a keyboard, a voice command, or other user input including the instruction.

The method 1900 includes, in response to the received user input, modifying the dialog tree to include, in a node associated with the line of text at which the user input was received, the dialog content of the node associated with the line of text includes the modified text (1910).

Figure 20:
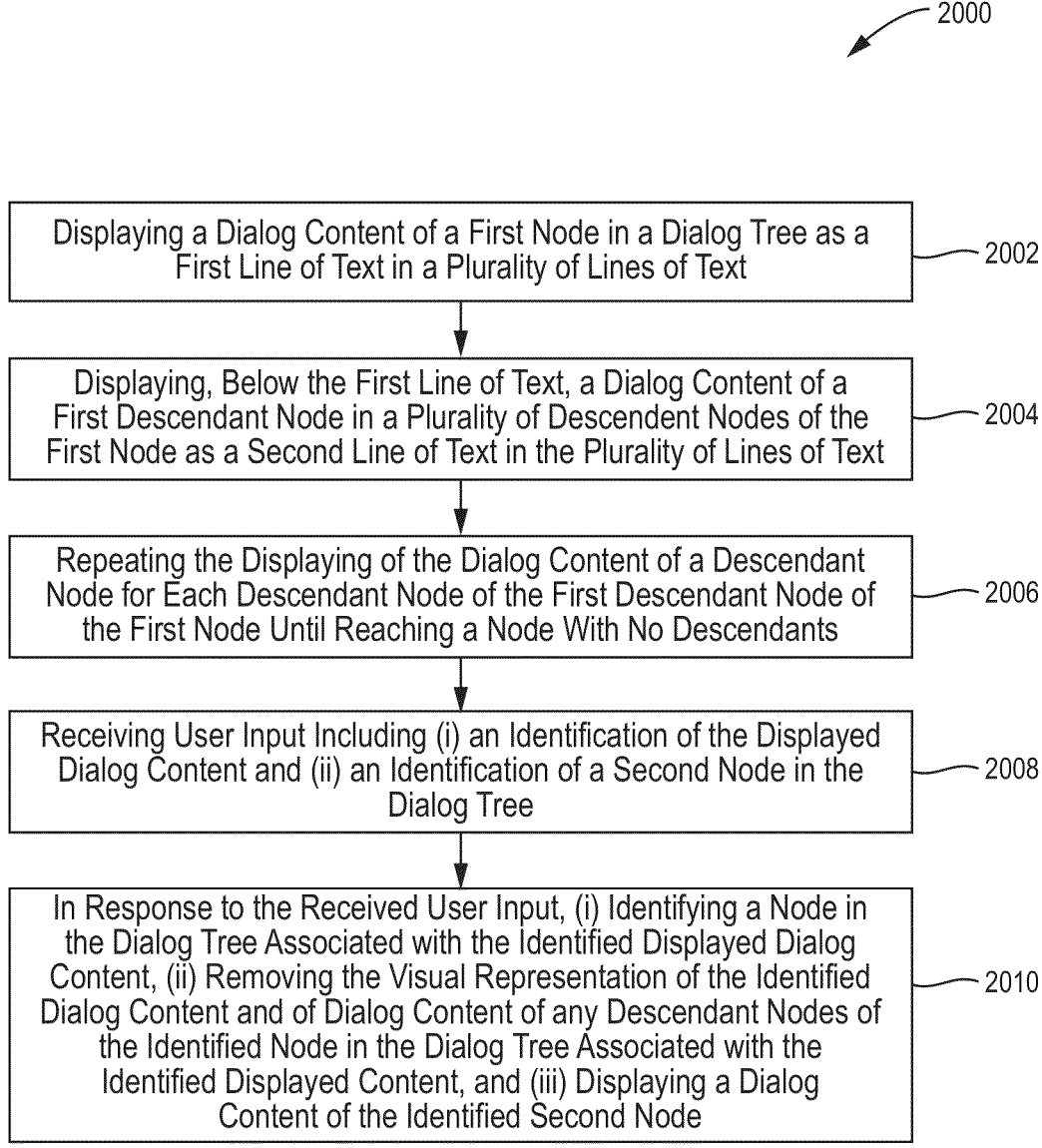
FIG. 20 is a flow diagram depicting one embodiment of a method for modifying a branching dialog tree which contains nodes representing the dialog of any number of computer-controlled characters and nodes representing the input of any number of users.

Referring now to FIG. 20 in brief overview, the methods and systems described herein may include a method 2000 of modifying a branching dialog tree which contains nodes representing the dialog of any number of computer-controlled characters and nodes representing the input of any number of users, the method 2000 including displaying the content of a node in the dialog tree as a first line of text in a plurality of lines of text (2002). The method 2000 includes displaying, below the first line of text, a dialog content of a first descendant node in a plurality of descendant nodes of the first node as a second line of text in the plurality of lines of text (2004). The method 2000 includes repeating the displaying of dialog content of descendant nodes in the plurality of descendant nodes until reaching a node with no descendant nodes (2006). The method 2000 includes receiving user input, the user input including (i) an identification of displayed dialog content and (ii) an identification of a second node in the dialog tree (2008). The method 2000 includes, in response to the received user input, (i) identifying a node in the dialog tree associated with the identified displayed dialog content, (ii) removing the visual representation of the identified dialog content and of dialog content of any descendant nodes of the identified node in the dialog tree associated with the identified displayed content, and (iii) displaying a dialog content of the identified second node (2010).

Referring back to FIG. 8, in which the block diagram depicted an embodiment of a user interface 220 providing functionality for receiving author-specified conditions, FIG. 8 depicted a user interface element with which the user interface engine 210 can receive conditions to associate with specific nodes for application to subsequent nodes. As shown in FIG. 8, the author associated a condition regarding what output line to use if the player requests cream of wheat but the system 200 has stored a value of zero for a variable identifying how many units of cream of wheat are available. Note that one of ordinary skill in the art will understand that a wide range of variables not limited to in-game characteristics; e.g., without limitation, an author could have specified a condition to select an output line of dialog based on whether a game play variable should be set to easy, medium, or hand (such as, for example, specifying that if a variable make_user_miserable==true, reply with output text indicating none of the users requests are available). As another illustrative example, without limitation, the condition may refer to another setting stored outside of the dialog application; for example, the author may indicate that if a variable managed by a game application specifies that a character is associated with having certain features (won a number of quests, defeated a number of opponents, or other characteristics related to gameplay), the output line should be selected from one branch while if the character does not have those features, the output line should be selected from another branch. Therefore, referring again to FIG. 20 in greater detail and in connection with FIGS. 2-19 and 21A-B, the method 2000 includes displaying the content of a node in the dialog tree as a first line of text in a plurality of lines of text (2002). The method 2000 includes displaying, below the first line of text, a dialog content of a first descendant node in a plurality of descendant nodes of the first node as a second line of text in the plurality of lines of text (2004). The method 2000 includes repeating the displaying of dialog content of descendant nodes in the plurality of descendant nodes until reaching a node with no descendant nodes (2006). These lines of text may be displayed as described in connection with FIGS. 2-19 and 21A-21B.

The method 2000 includes receiving user input, the user input including (i) an identification displayed dialog content and (ii) an identification of a second node in the dialog tree (2008).

The method 2000 includes, in response to the received user input, (i) identifying a node in the dialog tree associated with the identified displayed dialog content, (ii) removing the visual representation of the identified dialog content and of dialog content of any descendant nodes of the identified node in the dialog tree associated with the identified displayed content, and (iii) displaying a dialog content of the identified second node (2010).

The method 2000 may include displaying a dialog content of a descendant node of the identified second node. The method 2000 may include repeating the display of the dialog content for each descendant node in a plurality of descendant nodes of the identified second descendant node, until reaching a node with no descendants.

Figure 21A:
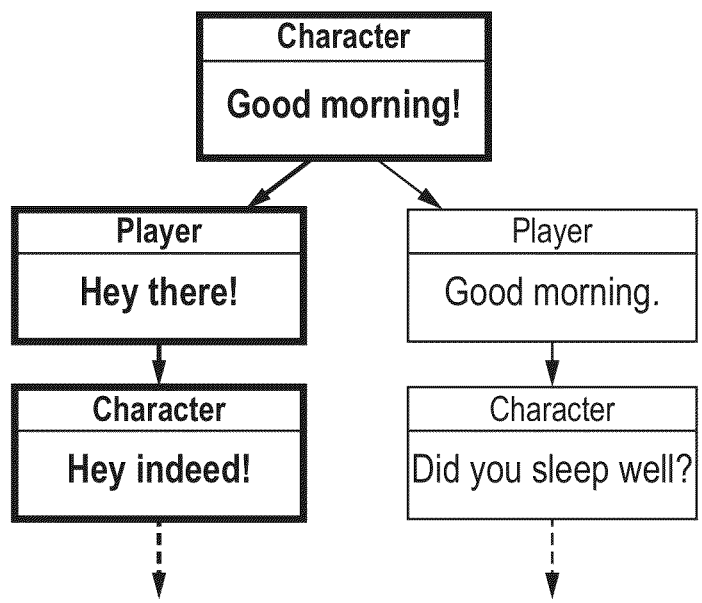
FIG. 21A is a diagram depicting one embodiment of a portion of a nonlinear dialog tree having two branches, each branch having at least two nodes.
Figure 21B:
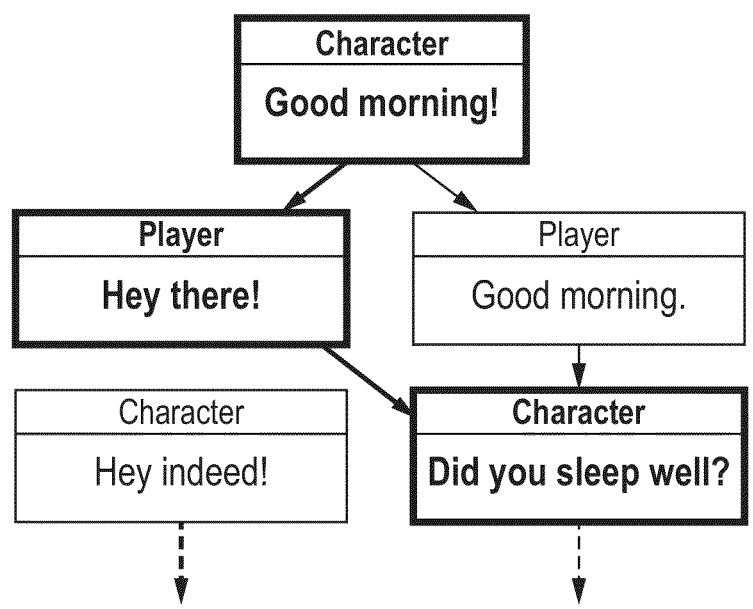
FIG. 21B is a diagram depicting one embodiment of a portion of a nonlinear dialog tree in which a first node is modified to have an association with a descendant node of a node in a second branch in the nonlinear dialog tree.

As depicted in FIG. 21A-B, in a portion of a nonlinear dialog tree having two branches, each branch having at least two nodes, when the user interface engine 210 receives the user input providing the instruction to modify the connections between nodes, the user interface engine 210 may modify the association between a first node in a first branch so that it is associated with a second node in a second branch. As shown in the example provided in FIG. 21B, after the modification, the node including the input text "Hey there!" no longer points to the descendant node including the output text "Hey Indeed!" but instead points to the node containing the output text "Did you sleep well?", which may still be the descendant node of the node containing the input text "Good morning."

The methods and systems described herein may include a method of modifying a branching dialog tree which contains nodes representing the dialog of any number of computer-controlled characters and nodes representing the input of any number of users, the method including displaying the content of a node in the dialog tree as a distinct visual entity; displaying the content of one of the node's descendant nodes as a separate visual entity (e.g., in a manner denoting its relation to its parent); repeating this process iteratively for a single descendant node of each descendant node until reaching a node with no descendants; receiving user input including an instruction to create a new sibling node of a specified existing node; and in response to the creation of the new sibling node, removing the visual representation of all of the specified existing node's descendants; replacing the visual representation of the specified existing node with a visual entity displaying the content of the newly created node. As indicated above, the instruction may be received via keyboard command, via clicking a button or other interface element in the user interface element, via voice command, and/or via touch to a touch-sensitive screen. The text displayed in the visual representation may be a line of text and the line of text may be editable by the author. In response to receiving input representing editing of a displayed line of text, the user interface engine 210 may modify a dialog content of a node associated with the displayed line of text. In some embodiments, the visual representation is a menu, such as a drop down menu.

A method of modifying the topology of a branching dialog tree which contains nodes representing the dialog of any number of computer-controlled characters and nodes representing the input of any number of users may include displaying the content of a node in the dialog tree as a first, distinct visual entity (e.g., a distinct visual entity within a user interface); displaying the content of one of the node's descendant nodes as a second visual entity separate from the first visual entity; repeating this process iteratively for a single descendant node of each descendant node until reaching a node with no descendants; receiving user input identifying an existing node; in response to receiving the user input, presenting a means for the user to select a second existing node and in response, removing the visual representation of all of the first-specified existing node's descendants; and modifying the node storage system 230 so that the first-specified existing node is no longer considered a descendant of its parent node; assigning the second, selected node as a descendant of the first-specified node's parent; replacing the visual representation of the first-specified existing node with a visual entity displaying the content of the second, selected node; displaying the content of one of the second, selected node's descendant nodes as a separate visual entity; and repeating this process iteratively for a single descendant node of each descendant node until reaching a node with no descendants.

A method of modifying the display of a branching dialog tree which contains nodes representing the dialog of any number of computer-controlled characters and nodes representing the input of any number of users, includes displaying the contents of a node in the dialog tree as a first, distinct visual entity (e.g., in the user interface 220); displaying the content of one of the node's descendant nodes as a separate visual entity (e.g., separate from the first visual entity); repeating this process iteratively for a single descendant node of each descendant node until reaching a node with no descendants; receiving user input selecting a sibling node of a specified existing node; in response to the received user input, removing the visual representation of all of the specified existing node's descendants and replacing the visual representation of the specified existing node with a visual entity displaying the content of the newly selected sibling node; and displaying the content of one of the newly selected sibling node's descendant nodes as a separate visual entity; and repeating this process iteratively for a single descendant node of each descendant node until reaching a node with no descendants.

A method of representing and modifying a branching dialog tree which contains nodes representing the dialog of any number of computer-controlled characters and nodes representing the input of any number of users, includes displaying a content of a computer-controlled character dialog node and its descendants as a contiguous line of text for each contiguous descendant node that meets the following criteria: the descendant node is a computer-controlled character node associated with the same character as the initial node; the descendant node is associated with the same character as its parent node; and the descendant node has no siblings in the dialog tree; providing a visual indication of the boundary between text segments (e.g., a specified character) associated with each computer-controlled character dialog node; allowing the placement of a text-insertion cursor within the combined text associated with the node and its descendants; and in response to user input, modifying the content of the node corresponding to the portion of text where the text-insertion cursor was placed to reflect the user's input.

A method of representing and modifying a branching dialog tree which contains nodes representing the dialog of any number of computer-controlled characters and nodes representing the input of any number of users includes displaying the content of a computer-controlled character dialog node and its descendants as a contiguous line of text for each contiguous descendant node that meets the following criteria: the descendant node is a computer-controlled character node associated with the same character as the initial node; the descendant node is associated with the same character as its parent node; and the descendant node has no siblings in the dialog tree; and providing a visual indication of the boundary between text segments (e.g., a specified delimiter character) associated with each computer-controlled character dialog node. The method may include receiving user input associated with the placement of a text-insertion cursor within the combined text associated with the node and its descendants; in response to user input, modifying the content of the node associated with the portion of text wherein the text-insertion cursor was placed to reflect the user's input. As indicated above, the user input may be a typed delimiter character instead of or in addition to the placement of a text-insertion cursor. The method may include modifying the node storage component 230 so that the parent of this modified node is no longer considered its parent and creating a new computer-controlled character dialog node and setting the new node's content to contain only the text to the left of the cursor (or inserted delimiter character) and to the right of any existing visual indicator (e.g., delimiter character) to the left of the cursor; assigning this new computer-controlled character dialog node as the parent of the original, modified node; assigning this new computer-controlled character dialog node as the child of the original parent of the original, modified node; and assigning any node that was formerly the descendent of the original modified node as a descendant of the new computer-controlled character dialog node.

The method may include receiving input associated with the placement of a text-insertion cursor within the combined text associated with the node and its descendants and in response to a user command (e.g., typing the specified delimiter character), modifying the content of the node associated with the portion of text wherein the text-insertion cursor was placed to contain only the text to the left of the cursor (or newly typed delimiter) and to the right of any existing visual indicator (e.g., delimiter character) to the left of the cursor; modifying the node storage component 230 so that any descendant of this modified node is no longer considered its descendant node; creating a new computer-controlled character dialog node and setting its content to contain only the text to the right of the cursor (or newly typed delimiter) and to the left of any existing visual indicator (e.g., delimiter character) to the right of the cursor; assigning this new computer-controlled character dialog node as a descendant of the original, modified node; and assigning any node that was formerly the descendent of the original modified node as a descendant of the new computer-controlled character dialog node.

A user input node may have an instance of computer-controlled character dialog as a property directly associated with it, as opposed to a descendant node.

The computer-controlled character dialog may be displayed on the same line as the computer-controlled character dialog from a descendant node, providing a visual indication of the boundary between the two.

In some embodiments, the system 200 includes non-transitory, computer-readable medium comprising computer program instructions tangibly stored on the non-transitory computer-readable medium, wherein the instructions are executable by at least one processor to perform each of the steps of the methods described above.

Modification of the methods and systems described above will be apparent to those skilled in the art. For example, the system 200 may provide functionality to allow the author to assign different characters to different output nodes, place more than one output node between input nodes, and allow conditional branching between a chain of output nodes. Dynamic dialog can be specified by placing, for example and without limitation, brackets «» around sections of dialog that should be calculated based on current conditions. Conditions can be specified in any desired computer language, e.g., without limitation, JavaScript or Python. Similar to screenplay format, a character's actions that take place preceding, during, or after a line of dialog can be enclosed in, for example and without limitation, parentheses ( ) and inserted at the appropriate point in the dialog. The system 200 may export this information to the target playback system as animation information. Nodes can contain references to associated audio or animation media files. The data in the node storage component 230 may be imported or exported in any number of formats to facilitate interchange with existing authoring systems, intelligent-agent systems, or game engines.

It should be understood that the systems described above may provide multiple ones of any or each of those components and these components may be provided on either a standalone machine or, in some embodiments, on multiple machines in a distributed system. The phrases 'in one embodiment,' 'in another embodiment,' and the like, generally mean that the particular feature, structure, step, or characteristic following the phrase is included in at least one embodiment of the present disclosure and may be included in more than one embodiment of the present disclosure. Such phrases may, but do not necessarily, refer to the same embodiment. However, the scope of protection is defined by the appended claims; the embodiments mentioned herein provide examples.

The terms "A or B", "at least one of A or/and B", "at least one of A and B", "at least one of A or B", or "one or more of A or/and B" used in the various embodiments of the present disclosure include any and all combinations of words enumerated with it. For example, "A or B", "at least one of A and B" or "at least one of A or B" may mean (1) including at least one A, (2) including at least one B, (3) including either A or B, or (4) including both at least one A and at least one B.

Any step or act disclosed herein as being performed, or capable of being performed, by a computer or other machine, may be performed automatically by a computer or other machine, whether or not explicitly disclosed as such herein. A step or act that is performed automatically is performed solely by a computer or other machine, without human intervention. A step or act that is performed automatically may, for example, operate solely on inputs received from a computer or other machine, and not from a human. A step or act that is performed automatically may, for example, be initiated by a signal received from a computer or other machine, and not from a human. A step or act that is performed automatically may, for example, provide output to a computer or other machine, and not to a human.

The systems and methods described above may be implemented as a method, apparatus, or article of manufacture using programming and/or engineering techniques to produce software, firmware, hardware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be LISP, PROLOG, PERL, C, C++, C #, JAVA, Python, Rust, Go, or any compiled or interpreted programming language.

Each such computer program may be implemented in a computer program product tangibly embodied in a machine-readable storage device for execution by a computer processor. Method steps may be performed by a computer processor executing a program tangibly embodied on a computer-readable medium to perform functions of the methods and systems described herein by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of computer-readable devices, firmware, programmable logic, hardware (e.g., integrated circuit chip; electronic devices; a computer-readable non-volatile storage unit; non-volatile memory, such as semiconductor memory devices, including EPROM, EEPROM, and flash memory devices; magnetic disks such as internal hard disks and removable disks; magneto-optical disks; and CD-ROMs). Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium. A computer may also receive programs and data (including, for example, instructions for storage on non-transitory computer-readable media) from a second computer providing access to the programs via a network transmission line, wireless transmission media, signals propagating through space, radio waves, infrared signals, etc.

Figure 22A:
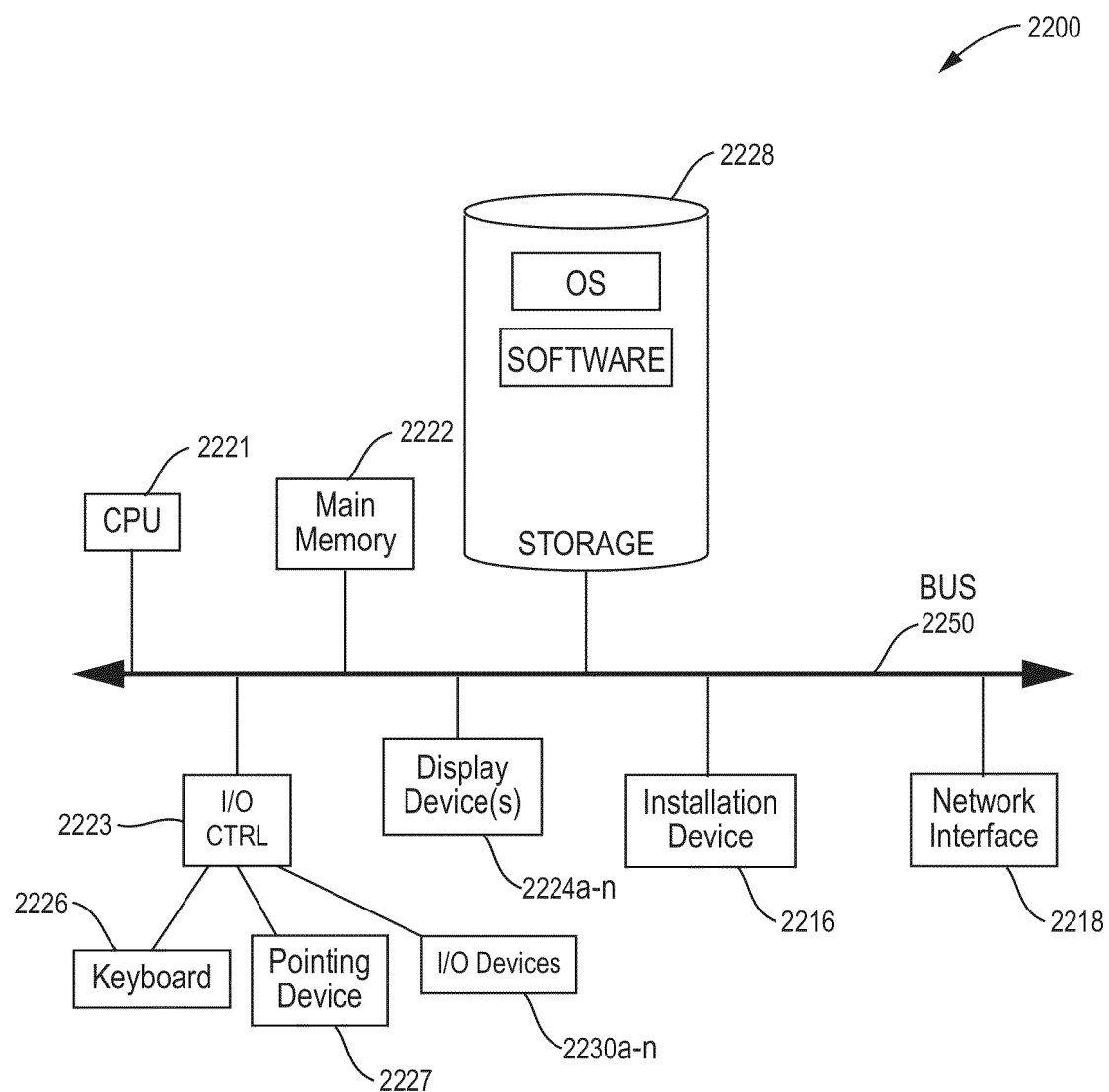
FIGS. 22A-22B are block diagrams depicting embodiments of computers useful in connection with the methods and systems described herein.
Figure 22B:
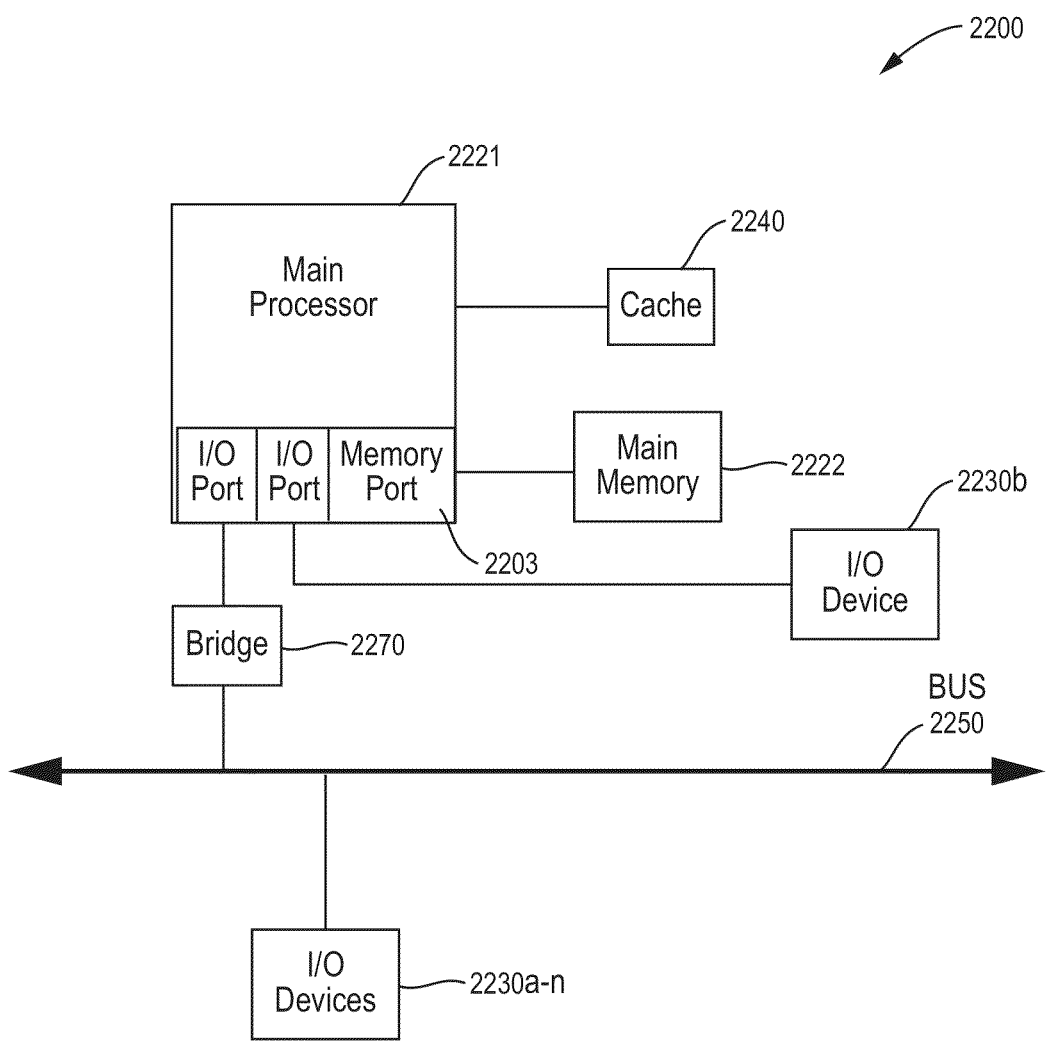

Referring now to FIGS. 22A and 22B, block diagrams of a computing device 2200 that may be modified to execute novel, non-obvious functionality for implementing the methods and systems described above. As shown in FIGS. 22A and 22B, each computing device 2200 includes a central processing unit 2221, and a main memory unit 2222. As shown in FIG. 22A, a computing device 2200 may include a storage device 2228, an installation device 2216, a network interface 2218, an I/O controller 2223, display devices 2224a-n, a keyboard 2226, a pointing device 2227, such as a mouse, and one or more other I/O devices 2230a-n. The storage device 2228 may include, without limitation, an operating system and software. As shown in FIG. 22B, each computing device 2200 may also include additional optional elements, such as a memory port 2203, a bridge 2270, one or more input/output devices 2230a-n (generally referred to using reference numeral 2230), and a cache memory 2240 in communication with the central processing unit 2221.

The central processing unit 2221 is any logic circuitry that responds to and processes instructions fetched from the main memory unit 2222. In many embodiments, the central processing unit 2221 is provided by a microprocessor unit, such as: those manufactured by Intel Corporation of Mountain View, CA; those manufactured by Motorola Corporation of Schaumburg, IL; those manufactured by Transmeta Corporation of Santa Clara, CA; those manufactured by International Business Machines of White Plains, NY; or those manufactured by Advanced Micro Devices of Sunnyvale, CA. Other examples include RISC-V processors, SPARC processors, ARM processors, and processors for mobile devices. The computing device 2200 may be based on any of these processors, or any other processor capable of operating as described herein.

Main memory unit 2222 may be one or more memory chips capable of storing data and allowing any storage location to be directly accessed by the microprocessor 2221. The main memory 2222 may be based on any available memory chips capable of operating as described herein. In the embodiment shown in FIG. 22A, the processor 2221 communicates with main memory 2222 via a system bus 2250. FIG. 22B depicts an embodiment of a computing device 2200 in which the processor communicates directly with main memory 2222 via a memory port 2203. FIG. 22B also depicts an embodiment in which the main processor 2221 communicates directly with cache memory 2240 via a secondary bus, sometimes referred to as a backside bus. In other embodiments, the main processor 2221 communicates with cache memory 2240 using the system bus 2250.

In the embodiment shown in FIG. 22A, the processor 2221 communicates with various I/O devices 2230 via a local system bus 2250. Various buses may be used to connect the central processing unit 2221 to any of the I/O devices 2230, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 2224, the processor 2221 may use an Advanced Graphics Port (AGP) to communicate with the display 2224. FIG. 22C depicts an embodiment of a computing device 2200 in which the main processor 2221 also communicates directly with an I/O device 2230b via, for example, HYPERTRANSPORT, RAPIDIO, or INFINIBAND communications technology.

One or more of a wide variety of I/O devices 2230a-n may be present in or connected to the computing device 2200, each of which may be of the same or different type and/or form. Input devices include keyboards, mice, trackpads, trackballs, microphones, scanners, cameras, and drawing tablets. Output devices include video displays, speakers, inkjet printers, laser printers, 3D printers, and dye-sublimation printers. The I/O devices may be controlled by an I/O controller 2223 as shown in FIG. 22B. Furthermore, an I/O device may also provide storage and/or an installation medium 2216 for the computing device 2200. In some embodiments, the computing device 2200 may provide USB connections (not shown) to receive handheld USB storage devices such as the USB Flash Drive line of devices manufactured by Twintech Industry, Inc. of Los Alamitos, CA.

Referring still to FIG. 22A, the computing device 2200 may support any suitable installation device 2216, such as hardware for receiving and interacting with removable storage; e.g., disk drives of any type, CD drives of any type, DVD drives, tape drives of various formats, USB devices, external hard drives, or any other device suitable for installing software and programs. In some embodiments, the computing device 2200 may provide functionality for installing software over a network (not shown). The computing device 2200 may further comprise a storage device, such as one or more hard disk drives or redundant arrays of independent disks, for storing an operating system and other software. Alternatively, the computing device 2200 may rely on memory chips for storage instead of hard disks.

Furthermore, the computing device 2200 may include a network interface 2218 to interface to a network through a variety of connections including, but not limited to, standard telephone lines, LAN or WAN links (e.g., 802.11, T1, T3, 56 kb, X.25, SNA, DECNET, RDMA), broadband connections (e.g., ISDN, Frame Relay, ATM, Gigabit Ethernet, Ethernet-over-SONET), wireless connections, virtual private network (VPN) connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, 802.15.4, Bluetooth, ZIGBEE, CDMA, GSM, WiMax, and direct asynchronous connections). In one embodiment, the computing device 2200 communicates with other computing devices 2200' via any type and/or form of gateway or tunneling protocol such as GRE, VXLAN, IPIP, SIT, ip6tnl, VTI and VTI6, IP6GRE, FOU, GUE, GENEVE, ERSPAN, Secure Socket Layer (SSL) or Transport Layer Security (TLS). The network interface 2218 may comprise a built-in network adapter, network interface card, PCMCIA network card, card bus network adapter, wireless network adapter, USB network adapter, modem, or any other device suitable for interfacing the computing device 2200 to any type of network capable of communication and performing the operations described herein.

In further embodiments, an I/O device 2230 may be a bridge between the system bus 2250 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 2200 of the sort depicted in FIGS. 22A and 22B typically operates under the control of operating systems, which control scheduling of tasks and access to system resources. The computing device 2200 can be running any operating system such as any of the versions of the MICROSOFT WINDOWS operating systems, the different releases of the UNIX and LINUX operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 7, WINDOWS 8, WINDOWS VISTA, WINDOWS 10, and WINDOWS 11 all of which are manufactured by Microsoft Corporation of Redmond, WA; MAC OS or Apple iOS, both manufactured by Apple Inc. of Cupertino, CA; OS/2 manufactured by International Business Machines of Armonk, NY; Red Hat Enterprise Linux, a Linux-variant operating system distributed by Red Hat, Inc., of Raleigh, NC; Ubuntu, a freely-available operating system distributed by Canonical Ltd. of London, England; CentOS, a freely-available operating system distributed by the centos.org community; SUSE Linux, a freely-available operating system distributed by SUSE, or any type and/or form of a Unix operating system, among others.

Having described certain embodiments of methods and systems for generating and selectively displaying portions of scripts for nonlinear dialog between at least one computing device and a user, it will be apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A method for generating and selectively displaying portions of scripts for nonlinear dialog between at least one computing device and a user, the method comprising:

receiving, by a user interface for receiving from an author a plurality of portions of a script for a nonlinear dialog between a user participant in the nonlinear dialog and a non-user participant in the nonlinear dialog, a first portion in the plurality of portions of the script, the first portion including text representing a first branch of the nonlinear dialog and associated with the non-user participant;

receiving, by the user interface, a second portion of the script, the second portion associated with the user participant in the nonlinear dialog and including text responsive to the text in the first portion;

receiving, by the user interface, a third portion of the script associated with the non-user participant, the third portion including text responsive to text in the second portion;

receiving, by the user interface, an instruction to generate a second branch of the nonlinear dialog;

modifying, by a user interface engine, the user interface to remove a display of the second portion of the text and of the third portion;

receiving, by the user interface, a fourth portion of the script, the fourth portion associated with the user participant in the nonlinear dialog and including text responsive to text in the first portion;

receiving, by the user interface, a fifth portion of the script associated with the non-user participant, the fifth portion including text responsive to text in the fourth portion; and generating, by the user interface engine, a version of the script for display including the first portion and the fourth portion and the fifth portion.

2. The method of claim 1, wherein receiving the first portion further comprises receiving an indication that the first portion represents the at least one branch of the nonlinear dialog.

3. The method of claim 1 further comprising storing the text of the first portion in a first node of a branching dialog tree.

4. The method of claim 3 further comprising storing the text of the second portion in a descendant node of the first node of the branching dialog tree.

5. The method of claim 4 further comprising:

storing a first subset of the text of the third portion in a first descendant node of a second node;

identifying the first descendant node of the second node as an input node;

storing a second subset of the text of the third portion in a second descendant node of the second node; and identifying the second descendant node of the second node as an output node.

6. The method of claim 1 further comprising, before generating the version of the script, receiving an instruction to generate the version of the script representing the second branch of the nonlinear dialog.

7. The method of claim 1 further comprising:

receiving an instruction to generate a second version of the script representing the first branch of the nonlinear dialog; and generating a second version of the script for display including the first portion and the second portion and the third portion.

8. The method of claim 1, wherein receiving the third portion further comprises:

receiving a subset of the text of the third portion; and displaying, by the user interface, recommended text for addition to the subset.

9. The method of claim 1, wherein receiving the third portion of the script includes receiving an identification of a condition for satisfaction prior to inclusion of the third portion in the script.

10. The method of claim 9 further comprising:

identifying a node in a branching dialog tree storing the text of the third portion of the script; and associating the identified node with the identified condition.

11. The method of claim 1 further comprising:

receiving a command to validate the first branch;

analyzing each node in the first branch of a branching dialog tree to identify a subset of the nodes in the branching dialog tree associated with at least one condition; and determining whether the at least one condition satisfies at least one requirement for a valid condition.

* * * * *